United States Patent
Zenkyu

(10) Patent No.: US 10,680,728 B2
(45) Date of Patent: Jun. 9, 2020

(54) RADIO COMMUNICATION SYSTEM, RECEIVING APPARATUS, CORRECTION APPARATUS, ANTENNA CORRECTION METHOD AND PROGRAM

(71) Applicant: NEC Corporation, Minato-ku, Tokyo (JP)

(72) Inventor: Ryuji Zenkyu, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/307,533

(22) PCT Filed: Jun. 8, 2017

(86) PCT No.: PCT/JP2017/021312
§ 371 (c)(1),
(2) Date: Dec. 6, 2018

(87) PCT Pub. No.: WO2017/213219
PCT Pub. Date: Dec. 14, 2017

(65) Prior Publication Data
US 2019/0149251 A1  May 16, 2019

(30) Foreign Application Priority Data
Jun. 9, 2016 (JP) ................................. 2016-115359

(51) Int. Cl.
*H04B 17/21*  (2015.01)
*H01Q 19/17*  (2006.01)
(Continued)

(52) U.S. Cl.
CPC .............. *H04B 17/21* (2015.01); *H01Q 3/08* (2013.01); *H01Q 15/0013* (2013.01);
(Continued)

(58) Field of Classification Search
CPC ...... H04B 17/21; H04B 17/12; H04B 17/345; H01Q 3/08; H01Q 15/0013; H01Q 19/17
See application file for complete search history.

(56) References Cited

U.S. PATENT DOCUMENTS

2015/0357710 A1     12/2015   Li
2018/0287263 A1*   10/2018   Hirabe ................ H01Q 21/20

FOREIGN PATENT DOCUMENTS

JP          2015231108 A      12/2015

OTHER PUBLICATIONS

Allen, et al., "Orbital angular momentum of light and the transformation of Laguerre-Gaussian laser modes", Physical Review A, Jun. 1, 1992, pp. 8185-8190, vol. 45, No. 11 (6 pages total).
(Continued)

*Primary Examiner* — Sophia Vlahos

(57) ABSTRACT

A radio communication system is provided with: a transmission apparatus that responds to OAM radio communication, a receiving apparatus that responds to OAM radio communication, and a correction apparatus. The correction apparatus corrects antenna axes of the transmission apparatus and the receiving apparatus, based on correlation information that associates: information related to the antennas of the transmission apparatus and the receiving apparatus, and an inter-mode interference pattern that characterizes interference by a transmission mode when the transmission apparatus transmits a signal, on a receiving mode when the receiving apparatus receives a signal.

10 Claims, 23 Drawing Sheets

(51) Int. Cl.
   *H01Q 15/00*   (2006.01)
   *H04B 17/12*   (2015.01)
   *H01Q 3/08*    (2006.01)
   *H04B 17/345*  (2015.01)

(52) U.S. Cl.
   CPC ............ *H01Q 19/17* (2013.01); *H04B 17/12* (2015.01); *H04B 17/345* (2015.01)

(56) References Cited

OTHER PUBLICATIONS

Vasnetsov, et al., "Analysis of orbital angular momentum of a misaligned optical beam", New Journal of Physics, 2005, pp. 1-17, vol. 7, No. 46 (18 pages total).

Liu, et al., "Orbital angular momentum (OAM) spectrum correction in free space optical communication", Optics Express, 2008, vol. 16, No. 10 (11 pages total).

Zhou, et al., "Novel Method of Axis Alignment in Orbital Angular Momentum Wireless Communication", IEEE WCNC, 2015, pp. 586-590 (5 pages total).

Tian, et al., "Beam axis detection and alignment for uniform circular array-based orbital angular momentum wireless communication", IET The Institution of Engineering and Technology, 2015, pp. 44-50, vol. 10, Iss. 1 (7 pages total).

Xie, et al., "Exploiting the Unique Intensity Gradient of an Orbital-Angular-Momentum Beam for Accurate Receiver Alignment Monitoring in a Free-Space Communication Link", ECOC, 2015 (4 pages total).

Wu, et al., "Inter-Mode Crosstalk Compensation for Radio Orbital Angular Momentum Multiplexing Systems under Misaligned Condition Using Multiple-Input Multiple-Output Techniques", 15th International Conference on Optical Communications and Networks, 2016 (4 pages total).

Written Opinion issued by the International Bureau in corresponding International Application No. PCT/JP2017/021312, dated Aug. 15, 2017.

* cited by examiner

FIG. 10

512; INTER-MODE INTERFERENCE PATTERN

| RECEIVING POWER RATE IN RECEIVING MODE (-2) | RECEIVING POWER RATE IN RECEIVING MODE (-1) | RECEIVING POWER RATE IN RECEIVING MODE (0) | RECEIVING POWER RATE IN RECEIVING MODE (1) | RECEIVING POWER RATE IN RECEIVING MODE (2) |
|---|---|---|---|---|
| 0.0 | 0.1 | 0.8 | 0.1 | 0.0 |
| 0.0 | 0.0 | 0.15 | 0.75 | 0.1 |
| 0.0 | 0.1 | 0.9 | 0.0 | 0.0 |
| 0.0 | 0.0 | 0.2 | 0.7 | 0.1 |
| ... | ... | ... | ... | ... |

FIG. 11

513: TRANSMISSION ANTENNA ANGLE

| $\theta^{TX}$ | $\phi^{TX}$ |
|---|---|
| 0.1 | 0.0 |
| 0.1 | 0.0 |
| 0.2 | 0.0 |
| 0.2 | 0.0 |
| ... | ... |

FIG. 12

514: RECEIVING ANTENNA ANGLE

| $\theta^{RX}$ | $\phi^{RX}$ |
|---|---|
| 0.0 | 0.0 |
| 0.0 | 0.0 |
| 0.0 | 0.1 |
| 0.0 | 0.1 |
| ... | ... |

FIG. 14

| INDEX k | $\theta^{TX}$ | $\phi^{TX}$ | $\theta^{RX}$ | $\phi^{RX}$ |
|---|---|---|---|---|
| 1 | 0.1 | 0.0 | 0.0 | 0.0 |
| 2 | 0.2 | 0.0 | 0.0 | 0.0 |
| ... | ... | ... | ... | ... |

FIG. 15

| INDEX i | TRANSMISSION MODE |
|---|---|
| 1 | 0 |
| 2 | 1 |
| ... | ... |

FIG. 17

| | DATA REFERENCE TOOL FOR ANTENNA ANGLE AND INTER-MODE INTERFERENCE PATTERN | | | | |
|---|---|---|---|---|---|
| DATA SET NUMBER | FREQUENCY BAND | DISTANCE BETWEEN TRANSMISSION AND RECEIVING ANTENNAS | ANTENNA SHAPE | ANTENNA SIZE |
| 1 | 5GHz | 10m | PARABOLA | RADIUS 10cm |
| 2 | 5GHz | 30m | PARABOLA | RADIUS 10cm |
| 3 | 5GHz | 100m | PARABOLA | RADIUS 10cm |
| ... | ... | ... | ... | ... |

RADIO COMMUNICATION SYSTEM, RECEIVING APPARATUS, CORRECTION APPARATUS, ANTENNA CORRECTION METHOD AND PROGRAM

TECHNICAL FIELD

CROSS-REFERENCE TO RELATED APPLICATIONS

This application is a National Stage Entry of PCT/JP2017/021312 filed on Jun. 8, 2017, which claims priority from Japanese Patent Application 2016-115359 filed on Jun. 9, 2016, the contents of all of which are incorporated herein by reference, in their entirety. The present invention relates to a radio communication system, a receiving apparatus, a correction apparatus, an antenna correction method and a program. In particular the invention relates to a radio communication system, a receiving apparatus, a correction apparatus, an antenna correction method and a program, where an electromagnetic wave having Orbital Angular Momentum (OAM) is used.

BACKGROUND

In recent years consideration is being given to the adoption of multiplexed transmission systems for relay channels (mobile backhaul) connecting a base station and a backbone circuit. In particular, attention is being paid to applying radio communication (radio communication by OAM system) using an electromagnetic wave having OAM, to the abovementioned relay channels.

An OAM system, as shown in NPLs (Non-Patent Literatures) 1 to 4, is a multiplexed transmission system that uses orthogonality of phase in electromagnetic wave propagation direction vertical plane, and individual electromagnetic waves that are orthogonal are called modes. In the OAM system, by using the orthogonality of the modes in question, multiplexed transmission is realized. More specifically, a transmission apparatus according to the OAM system generates a plurality of modes when signals (data) are transmitted, and combines these for transmission. Meanwhile a receiving apparatus extracts signals by separating the combined modes in response to each mode, to realize multiplexed transmission.

In the OAM system, it is possible to distinguish between a mode for transmitting signals (below, denoted as transmission mode) and a mode for receiving signals (below, denoted as receiving mode). The transmission mode corresponds to a mode in which a post-modulation signal sequence is converted to an electromagnetic wave having orthogonality in the OAM system on a transmission side. The receiving mode corresponds to a mode for separating the original signal sequence from an electromagnetic wave having orthogonality in the OAM system on a receiving side.

PTL (Patent Literature) 1 discloses technology that performs correction of antenna axis using phase difference information.

[PTL 1]
Japanese Patent Kokai Publication No. JP2015-231108A.
[NPL 1]
L. Allen, M. W. Beijersbergen, R. J. C. Spreeuw, and J. P. Woerdman, "Orbital angular momentum of light and the transformation of Laguerre-Gaussian laser modes,"Phys. Rev. A, vol. 45, no. 11, 1992.
[NPL 2]
M. V. Vasnetsov, V. A. Pas'ko, and M. S. Soskin, "Analysis of orbital angular momentum of a misaligned optical beam, "New J. Phys. vol. 7, No. 46, 1-17, 2005.
[NPL 3]
Y.D. Liu, et al., "Orbital angular momentum (OAM) spectrum correction in free space optical communication", Opt. Express Vol. 16, No. 10, 2008.
[NPL 4]
Y. Zhou, H. Tian, G. Nie, "Novel Method of Axis Alignment in Orbital Angular Momentum Wireless Communication", IEEE WCNC 2015, Track1, 586-590, 2015.

SUMMARY

It is to be noted that the respective disclosures of the abovementioned cited technical literature are incorporated herein by reference thereto. The following analysis is given according to the present inventor.

In an ideal environment, when a transmission mode and a receiving mode are in alignment, a receiving apparatus can receive an original signal sequence discretely. However, when there is a large misalignment between transmission mode and receiving mode, the receiving apparatus cannot receive the original signal sequence. Since an OAM system is a multiplex transmission system using phase orthogonality in an electromagnetic wave propagation direction vertical plane, if transmission and receiving antenna axes are not aligned, the phase orthogonality in the electromagnetic wave propagation direction vertical plane collapses and interference between modes may occur. In other words, under ideal conditions, multiplex transmission according to the OAM system is possible, but under conditions where the antenna axes of the transmission and receiving antenna area not aligned, orthogonality between transmission mode and receiving mode collapses, and inter-mode interference occurs.

It is to be noted that in the disclosure of the present application, mode orthogonality means that cycles differ for phase rotation of 360° circumference centered on a vector in the direction of electromagnetic wave propagation. In the disclosure of the present application, where 1 is a positive integer, 1 cycle in a right handed rotation is denoted mode (1), and 1 cycle in a left handed rotation is denoted mode (−1). For example, a transmission mode of 2 cycles in a right handed rotation is denoted transmission mode (2), and a transmission mode of 2 cycles in a left handed rotation is denoted transmission mode (−2).

The abovementioned right rotation and left rotation means that cycle symmetry differs, and it is possible to denote 1 cycle of a left handed rotation as mode (1), and to denote 1 cycle of a right handed rotation as mode (−1). An antenna axis is the axis of the abovementioned phase rotation with respect to the antenna face, and indicates a perpendicular line with respect to an antenna face passing through the center of the antenna.

As described above, in the multiplex transmission system using the OAM system, antenna axis misalignment causes inter-mode interference, and results in a deterioration in reception quality. Therefore, in order to ensure reception quality, a correction (adjustment of antenna axis) is necessary so that antenna axes are aligned on transmission and receiving apparatus sides. It is to be noted that the occurrence of inter-mode interference due to a small misalignment in antenna axes is disclosed in NPLs 2 and 3.

NPL 4 proposes a search type method of correcting an antenna axis, but in this correction method, since the number of transmissions and receptions required in the search is at least several dozen, cost (electrical power cost, time cost) becomes a problem.

It is an object of the present invention to provide a radio communication system, a receiving apparatus, a correction apparatus, an antenna correction method and a program, which reduce the number of times a signal must be transmitted or received in order to correct an antenna axis.

According to a first aspect of the invention, a radio communication system is provided that includes: a transmission apparatus that responds to radio communication according to an OAM (Orbital Angular Momentum) system; a receiving apparatus that responds to radio communication according to the OAM system; and a correction apparatus that corrects antenna axes of the transmission apparatus and the receiving apparatus, based on correlation information that associates: information related to antennas of the transmission apparatus and the receiving apparatus, and an inter-mode interference pattern that characterizes interference by a transmission mode, when the transmission apparatus transmits a signal, on a receiving mode when the receiving apparatus receives a signal.

According to a second aspect of the invention, a receiving apparatus is provided that responds to radio communication according to an OAM (Orbital Angular Momentum) system, wherein the receiving apparatus corrects antenna axes of the transmission apparatus and the receiving apparatus, based on correlation information that associates: information related to antennas of a responding transmission apparatus and its own apparatus, and inter-mode interference patterns that characterize interference by a transmission mode on a receiving mode, when the transmission apparatus transmits a signal.

According to a third aspect of the invention, a correction apparatus is provided, being connected to a transmission apparatus that responds to radio communication according to an OAM (Orbital Angular Momentum) system, and a receiving apparatus that responds to radio communication according to the OAM system, wherein the correction apparatus corrects antenna axes of the transmission apparatus and the receiving apparatus, based on correlation information that associates: information related to antennas of the transmission apparatus and the receiving apparatus, and inter-mode interference patterns that characterize interference by a transmission mode, when the transmission apparatus transmits a signal, on a receiving mode when the receiving apparatus receives a signal.

According to a fourth aspect of the invention, an antenna correction method is provided, in a radio communication system comprising a transmission apparatus that responds to radio communication according to an OAM (Orbital Angular Momentum) system, and a receiving apparatus that responds to radio communication according to the OAM system, wherein the method comprises: preparing correlation information that associates: information related to antennas of the transmission apparatus and the receiving apparatus, and inter-mode interference patterns that characterize interference by a transmission mode, when the transmission apparatus transmits a signal, on a receiving mode when the receiving apparatus receives a signal; and correcting antenna axes of the transmission apparatus and the receiving apparatus, based on the correlation information.

According to a fifth aspect of the invention, an antenna correction program is provided to be executed in a computer controlling a apparatus connected to a transmission apparatus that responds to radio communication according to an OAM (Orbital Angular Momentum) system, and a receiving apparatus that responds to radio communication according to the OAM, the program executing a process of correcting antenna axes of the transmission apparatus and the receiving apparatus, based on correlation information that associates: information related to antennas of the transmission apparatus and the receiving apparatus, and inter-mode interference patterns that characterize interference by a transmission mode, when the transmission apparatus transmits a signal, on a receiving mode when the receiving apparatus receives a signal. The program may be recorded on a computer readable storage medium. The storage medium may be non-transient such as semiconductor memory, a hard disk, a magnetic recording medium, an optical recording medium or the like. The present invention may be embodied as a computer program product.

According to various aspects of the present invention, there is provided: a radio communication system, a receiving apparatus, a correction apparatus, an antenna correction method and a program, which reduce the number of times a signal must be transmitted or received in order to correct an antenna axis.

BRIEF DESCRIPTION OF DRAWINGS

FIG. 10 is a diagram for describing inter-mode interference patterns in the correlation information.

FIG. 11 is a diagram for describing transmission antenna angle in the correlation information.

FIG. 12 is a diagram for describing receiving antenna angle in the correlation information.

FIG. 14 is a diagram for describing antenna angle change by the antenna angle correction part.

FIG. 15 is a diagram for describing setting of transmission mode by a transmission mode setting part.

FIG. 17 is a diagram showing an example of a data reference tool for antenna angle and inter-mode interference pattern.

PREFERRED MODES

Figure 1:
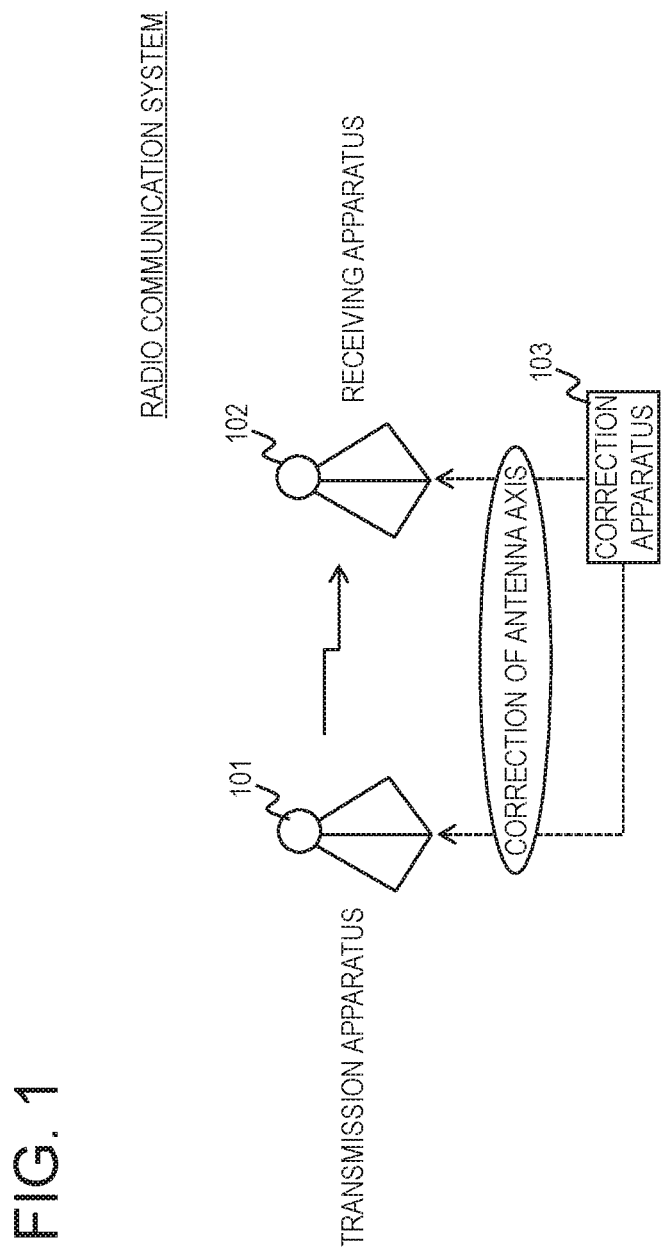
FIG. 1 is a diagram for describing an outline of an exemplary embodiment.

First, a description is given concerning an outline of an exemplary embodiment. It is to be noted that reference symbols in the drawings attached to this outline are added to respective elements for convenience as examples in order to aid understanding, and there is no intention to limit the invention in any way.

The radio communication system according to an exemplary embodiment includes: a transmission apparatus 101 that responds to radio communication according to an OAM system, a receiving apparatus 102 that responds to radio communication according to the OAM system, and a correction apparatus 103 (refer to FIG. 1). The correction apparatus 103 corrects antenna axes of the transmission apparatus 101 and the receiving apparatus 102, based on correlation information that associates: information related to the antennas of the transmission apparatus 101 and the receiving apparatus 102, and an inter-mode interference pattern that characterizes interference by a transmission mode when the transmission apparatus 101 transmits a signal, on a receiving mode when the receiving apparatus 102 receives a signal.

When the radio communication system shown in FIG. 1 is operated, correlation information is prepared in advance, which is obtained by measuring an electromagnetic wave having an OAM mode, outputted by the transmission apparatus 101 to the receiving apparatus 102. Alternatively, correlation information may also be prepared by executing a simulation by a computer in advance. The correlation information is, for example, information correlating antenna angle of the transmission apparatus 101 (transmission antenna angle; refer to FIG. 6A) and antenna angle of the receiving apparatus 102 (receiving antenna angle; refer to FIG. 6B), and an inter-mode interference pattern measured (computed) at a time of the antenna angle (refer to FIG. 8).

If inter-mode interference patterns are measured (or computed) for various antenna angles, and the antenna angles and inter-mode interference patterns are associated, and a database showing correlation of antenna angle and inter-mode interference is obtained (refer to FIG. 9 to FIG. 12).

Here, in an initial setting when the radio communication system is operated, normally antenna axes of the transmission apparatus 101 and the receiving apparatus 102 are installed so as not to have a misalignment. In this case, since a misalignment does not occur in the antenna axis of the transmission apparatus 101 and the antenna axis of the receiving apparatus 102, inter-mode interference does not occur, and it may be taken that this is an ideal environment.

However due to the effect of shaking and the like, a small misalignment of the antenna axes of the transmission apparatus 101 and the receiving apparatus 102 can be assumed. As a result, inter-mode interference between the transmission mode and the receiving mode occurs. The correction apparatus 103 measures a characteristic of the inter-mode interference thus generated as an inter-mode interference pattern, and searches the abovementioned database with this measured inter-mode interference pattern as a search key. As a result of the search, the inter-mode interference pattern closest to the measured inter-mode interference pattern is identified from the database.

With regard to the relationship between the identified inter-mode interference pattern and antenna angle, if the antennas of the transmission apparatus 101 and the receiving apparatus 102 are set to the antenna angle in question, it is possible to grasp that inter-mode interference has been produced, caused by a small misalignment of antenna axes due to the effect of shaking. In other words, with regard to the identified antenna angle, it is possible to grasp change amount from antenna angle under ideal conditions (no occurrence of inter-mode interference), and if reverse rotation is performed at an angle equivalent to the antenna angle identified by correlation information from the present antenna angle, it is possible to return to the antenna angle under ideal conditions. If the antenna angle returns to the ideal environment (if corrected), it is possible to inhibit the occurrence of inter-mode interference. It is to be noted that a specific example of correcting the antenna angle used the abovementioned inter-mode interference pattern is described later, referring to FIGS. 23A to 23C.

In the radio communication system according to the abovementioned exemplary embodiment, in order to correct the antenna axes of the transmission apparatus 101 and the receiving apparatus 102 based on correlation information gathered in advance, exhaustive search as disclosed in NPL 4 is not necessary, and it is possible to realize a correction of an antenna axis with a small number of signal transmissions and receptions.

A more detailed description is given concerning specific exemplary embodiments below, making reference to the drawings. It is to be noted that in each of the exemplary embodiments, the same symbols are attached to the same configuration elements and descriptions thereof are omitted.

<First Exemplary Embodiment>

A more detailed description is given concerning a first exemplary embodiment, using the drawings.

First, a description is given concerning basic apparatus configuration and operation for a radio communication system according to the first exemplary embodiment. Thereafter, as a specific situation, a description is given of operations when a transmission and receiving apparatuses including antennas are installed and when the transmission and receiving apparatuses are operated.

[System Configuration]

Figure 2:
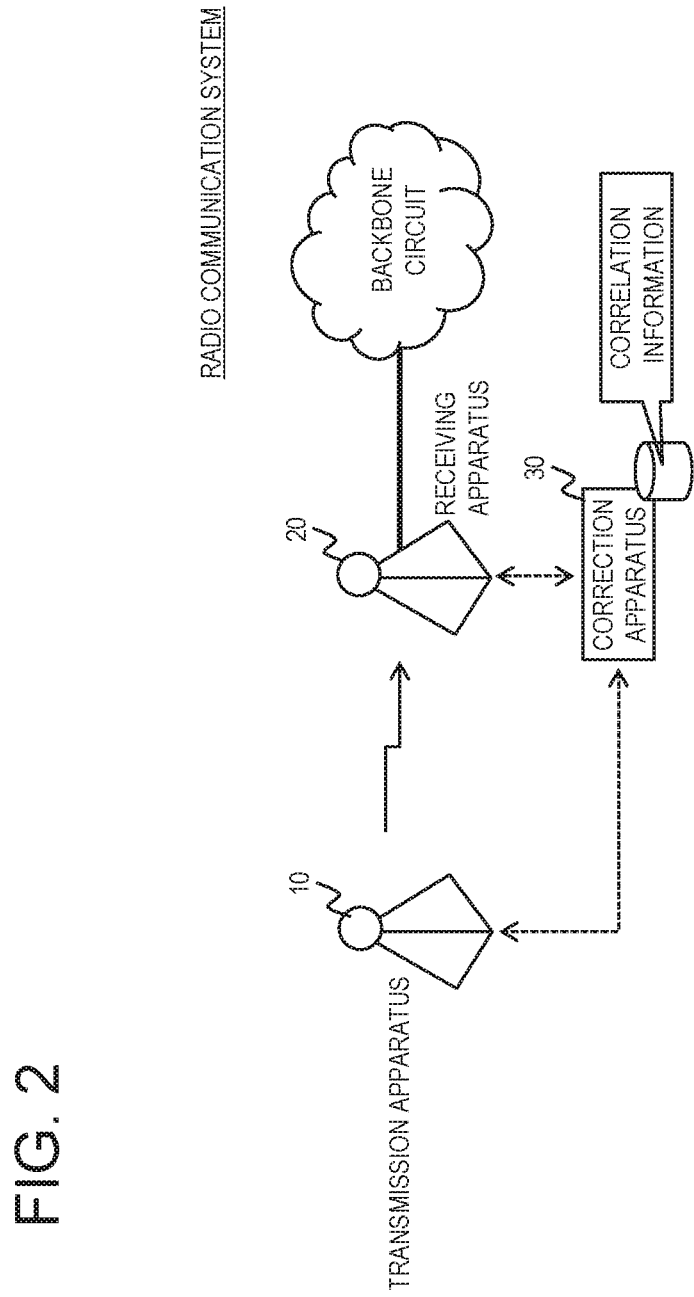
FIG. 2 is a diagram showing an example of an outline configuration of a radio communication system according to a first exemplary embodiment.

FIG. 2 is a diagram showing an example of an outline configuration of a radio communication system according to the first exemplary embodiment. Referring to FIG. 2, the radio communication system is configured to include a transmission apparatus 10, a receiving apparatus 20 and a correction apparatus 30.

The transmission apparatus 10 and the receiving apparatus 20 realize radio communication using an electromagnetic wave according to an OAM system, and for example, form a mobile back haul (relay channel). The transmission apparatus 10, for example, is equivalent to a base station, and is connected to a terminal (not shown in the drawings). The receiving apparatus 20, for example, is equivalent to a relay station, and is connected to a backbone circuit. It is to be noted that in the first exemplary embodiment a description is mainly given of a case where data (signal stream) is transmitted from the transmission apparatus 10 to the receiving apparatus 20, but in actuality, data may be transmitted from the receiving apparatus 20 to the transmission apparatus 10. That is, the transmission apparatus 10 has a receiving function, and the receiving apparatus 20 has a transmission function.

The correction apparatus 30 is an apparatus that performs management with regard to antennas of the transmission apparatus 10 and the receiving apparatus 20, and performs correction thereof. The correction apparatus 30 is configured to be connectable with each of the transmission apparatus 10 and the receiving apparatus 20, by a wireless or wired control line. The correction apparatus 30 is a apparatus that an operator of the radio communication system uses in periodic maintenance of antennas of the transmission apparatus 10 and the receiving apparatus 20. Accordingly the correction apparatus 30 is used as an option apparatus, without the need to be always connected with the transmission apparatus 10 and the receiving apparatus 20.

[Outline of System Operation]

Next, a description is given of a summary of operations of the radio communication system according to the first exemplary embodiment, making reference to FIG. 2.

Actions and operations of the radio communication system can be largely divided into 2 phases.

The first phase is a phase of advance collecting of information necessary for operation of the radio communication system. In the first phase, "correlation information", which is information related to misalignment between the antenna of the transmission apparatus 10 (transmission antenna) and the antenna of the receiving apparatus 20 (receiving antenna), is collected in advance.

The correlation information is information that associates information related to antennas of the transmission apparatus 10 and the receiving apparatus 20, and inter-mode interference patterns characterizing inter-mode interference (interference by a transmission mode on a receiving mode for an electromagnetic wave). Details are described later, but this correlation information is collected by simulation using computation or measurement at a site (actual environment) where the transmission apparatus 10 and receiving apparatus 20 are installed or in an environment using experimental units. The collected correlation information is stored inside the correction apparatus 30.

The second phase is a phase in which the correction apparatus 30 corrects (adjusts) the transmission and receiving antenna axes using the correlation information.

As a case where the second phase is executed, the following 2 points are assumed.

The first case is one where the transmission apparatus 10 and the receiving apparatus 20 are first installed on site. As disclosed in NPLs 2 and 3, if the antenna axes of the transmission and receiving antennas are misaligned, inter-mode interference may occur and reception characteristic may greatly deteriorate. In order to keep the reception characteristic of an OAM system in a preferred condition, when installing the antennas of the transmission apparatus 10 and the receiving apparatus 20, it is required to have the antenna axes of the transmission and receiving antennas in alignment as much as possible.

Here, a method of matching the antenna axes disclosed in NPL 4 in alignment can satisfy the abovementioned requirement. However, the method disclosed in NPL 4 is a search type method. Therefore, in order to obtain optimum (satisfactory) alignment of antenna axes, a large amount of search is required, and transmission and receiving electrical power cost and time cost increase.

In this regard, in the radio communication system according to the first exemplary embodiment, "correlation information" stored in the correction apparatus 30 is used to execute correction of the antenna axes of the transmission and receiving antennas with high accuracy and low cost (electrical power cost and time cost with regard to transmission and receiving of signals).

The second case is one where the transmission apparatus 10 and the receiving apparatus 20 are operated in practice. As described above, if there is a small misalignment of an antenna axis in the OAM system, inter-mode interference occurs and there is a deterioration in reception characteristic. For example, when real apparatuses are installed (the first case with regard to the abovementioned second phase), even if antennas can be installed at an ideal location such that inter-mode interference does not occur, due to external effects such as wind and rain and shaking, small misalignments in transmission and receiving antenna axes occur at a time of operation, and situations can be expected where inter-mode interference occurs.

In order to resolve this type of problem, performing correction of antenna axes may be considered, but if the search type method disclosed in NPL 4 is used, the time cost with regard to correction is large, and deterioration in communication quality continues for a long time. Therefore, in the radio communication system according to the first exemplary embodiment, high speed antenna angle correction is realized by using correlation information stored in the correction apparatus 30. As a result thereof, it is possible to immediately eliminate deterioration in communication quality lasting a long time, and contribute to overall communication quality improvement.

[Apparatus Configuration]

Next, a description is given concerning configurations of respective apparatuses forming the radio communication system.

Figure 3:
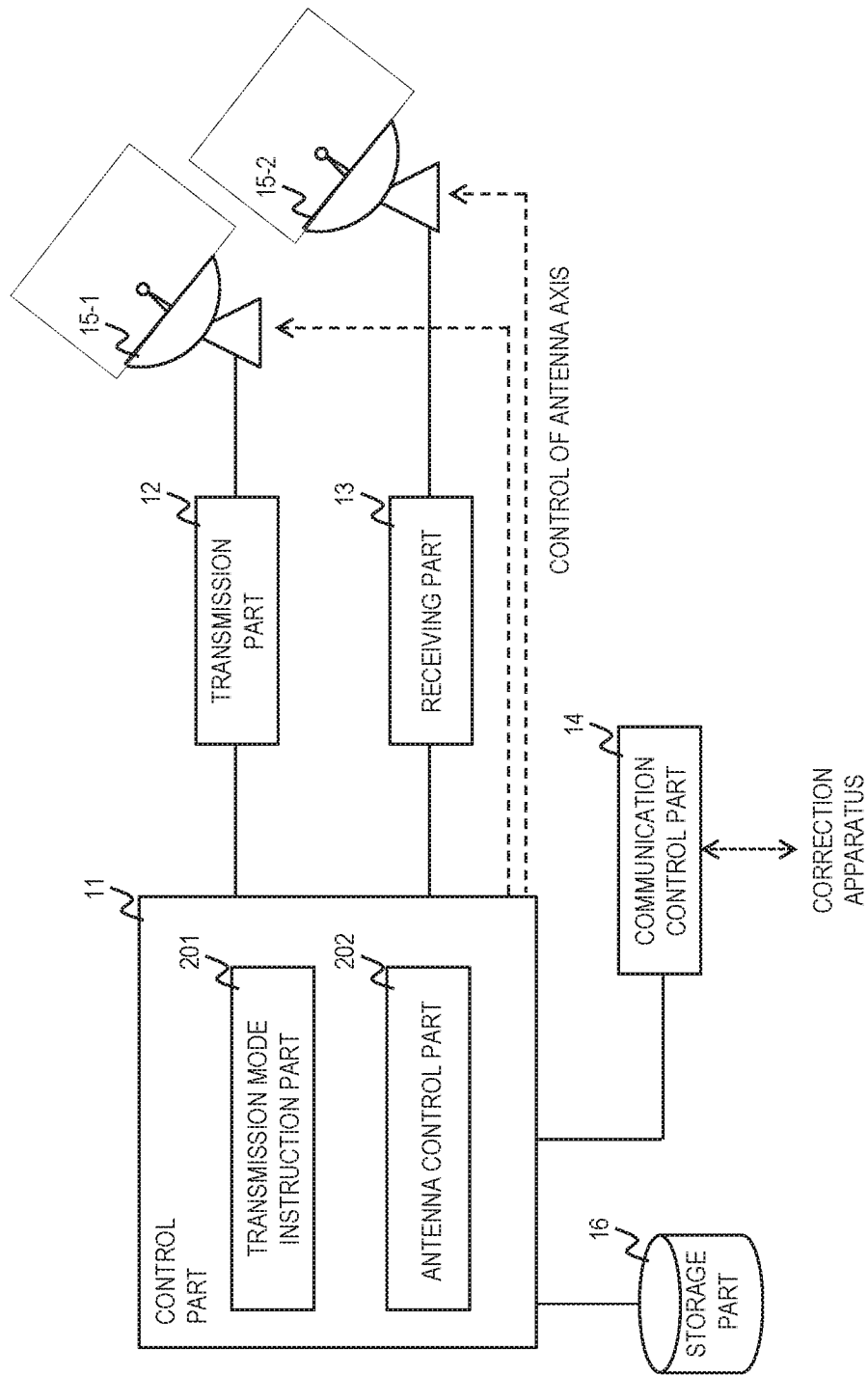
FIG. 3 is a block diagram showing an example of an internal configuration of a transmission apparatus according to the first exemplary embodiment.

FIG. 3 is a block diagram showing an example of an internal configuration of the transmission apparatus 10. Referring to FIG. 3, the transmission apparatus 10 includes a control part 11, a transmission part 12, a receiving part 13, a communication control part 14, a transmission antenna 15-1, a receiving antenna 15-2, and a storage part 16. It is to be noted that in FIG. 3, illustrations of antennas and the like for the transmission apparatus 10 to communicate with a terminal (not shown in the drawings) are omitted.

The control part 11, for example, is configured by a CPU (Central Processing Unit), and is a means for realizing functionality of the transmission apparatus 10. The control part 11 realizes radio communication with the receiving apparatus 20 by controlling the transmission part 12 and the receiving part 13. The control part 11 performs information exchange with the correction apparatus 30 via the communication control part 14 that controls communication with the correction apparatus 30.

When an instruction is given for transition to operation mode for adjusting an antenna (denoted below as antenna adjustment mode) by the correction apparatus 30, the control part 11 transmits an electromagnetic wave by the OAM system according to transmission mode and antenna angle instructed by the correction apparatus 30. On notification of the antenna angle (optimum transmission antenna angle to be described later) from the correction apparatus 30, the control part 11 changes the antenna angle based on the notified antenna angle.

The control part 11 is provided with a transmission mode instruction part 201 and an antenna control part 202.

The transmission mode instruction part 201 is a means for instructing the transmission part 12 to transmit an electromagnetic wave according to a transmission mode instructed by the correction apparatus 30.

The antenna control part 202 is a means for controlling an antenna axis based on an instruction from the correction apparatus 30. Specifically, the antenna control part 202 controls antenna angle of the transmission antenna 15-1 and the receiving antenna 15-2.

The transmission part 12 encodes and modulates a signal stream from the control part 11, and outputs an electromagnetic wave having OAM from the transmission antenna 15-1.

The receiving part 13 performs demodulation and decoding of the electromagnetic wave obtained from the receiving antenna 15-2, and outputs the decoded signal stream to the control part 11.

The transmission antenna 15-1 and the receiving antenna 15-2 are antennas corresponding to the OAM system. These antennas are provided with a mechanism (actuator, not shown in the drawings) to enable the angle of the axes thereof to be changed.

The storage part 16 stores data necessary when the control part 11 is operates. It is to be noted that processing performed by the control part 11 of the transmission apparatus 10 may be implemented by a computer program that executes respective processes described later on a computer installed in the transmission apparatus 10, using hardware thereof. The abovementioned computer program is installed in the storage part 16. The storage part 16 is configured by a storage medium such as a HDD (Hard Disk Drive) or the like.

Figure 4:
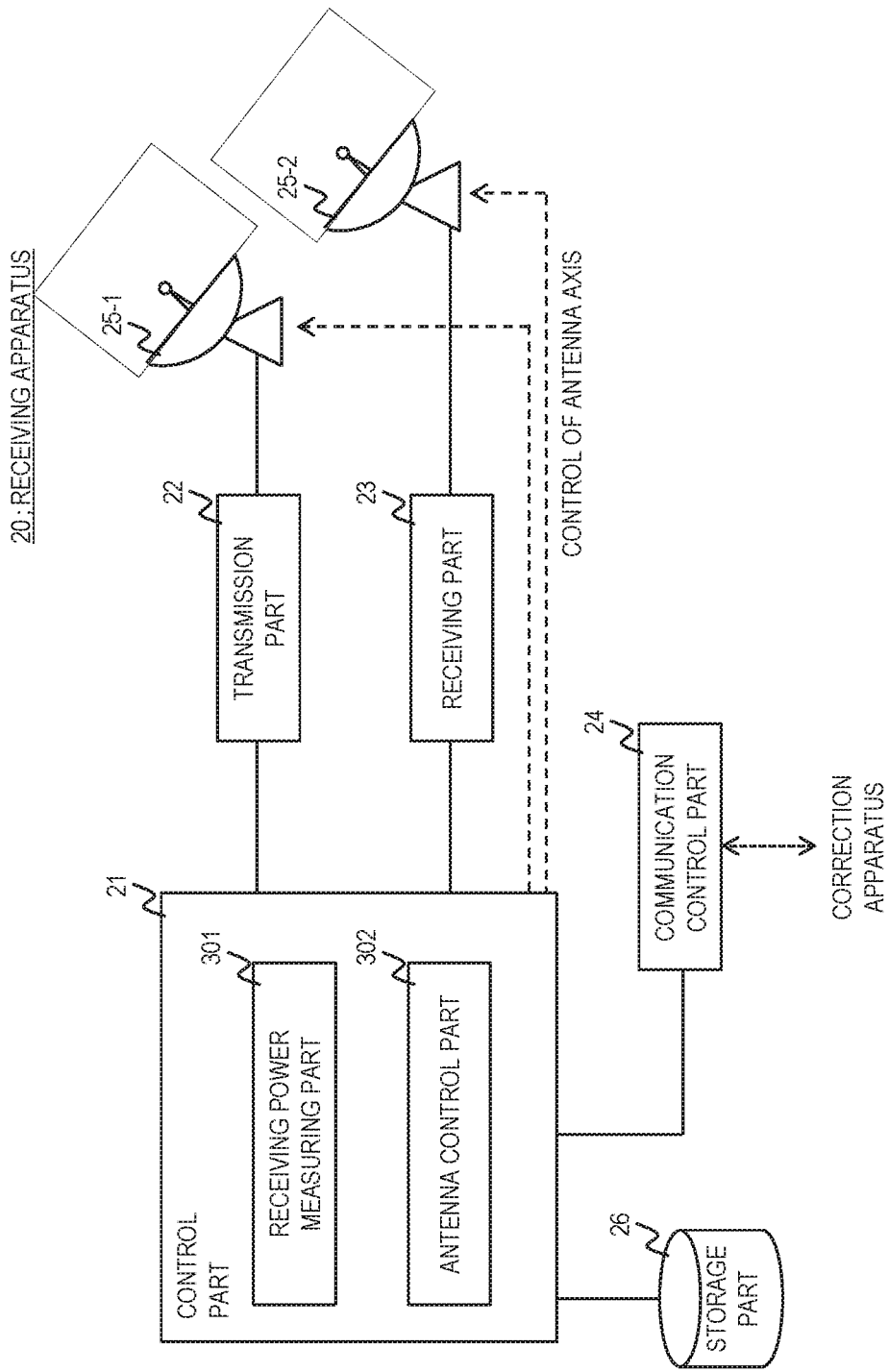
FIG. 4 is a block diagram showing an example of an internal configuration of a receiving apparatus according to the first exemplary embodiment.

FIG. 4 is a block diagram showing an example of an internal configuration of the receiving apparatus 20. Since the basic configuration of the transmission apparatus 10 shown in FIG. 3 and the receiving apparatus 20 shown in FIG. 4 can be taken as being the same, an explanation of a point of difference thereof is given.

A point of difference between the transmission apparatus 10 and the receiving apparatus 20 is that, when notification is given of transition to an antenna modulation mode, operations are different for the transmission apparatus 10 and the receiving apparatus 20. When there is an instruction of a transition to the antenna modulation mode, the control part 21 of the receiving apparatus 20 changes antenna angle based on an instruction from the correction apparatus 30, and also measures electrical power for each receiving mode for received signals and outputs the measurement result to the correction apparatus 30. A means for measuring the receiving power is a receiving power measuring part 301.

It is to be noted that when an antenna angle (optimum receiving antenna angle to be described later) is notified by the correction apparatus 30, the point of changing the antenna angle based on the notified antenna angle is the same as for the transmission apparatus 10.

Figure 5:
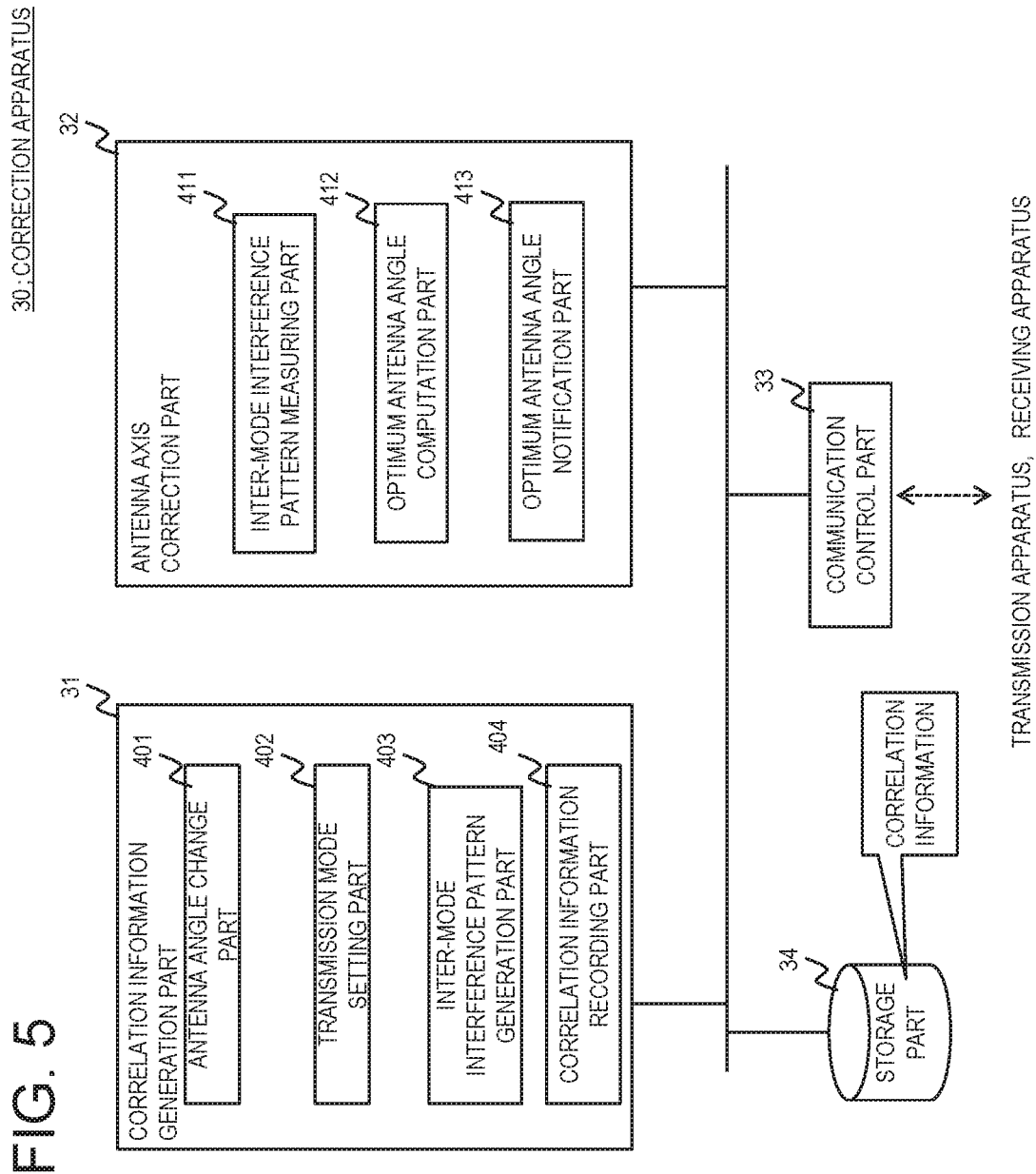
FIG. 5 is a block diagram showing an example of an internal configuration of a correction apparatus according to the first exemplary embodiment.

FIG. 5 is a block diagram showing an example of an internal configuration of the correction apparatus 30. Referring to FIG. 5, the correction apparatus 30 is provided with a correlation information generation part 31, an antenna axis correction part 32, a communication control part 33, and a storage part 34.

The correlation information generation part 31 and the antenna axis correction part 32 communicate with the apparatuses via the communication control part 33, which is a means for controlling communication between the transmission apparatus 10 and the receiving apparatus 20, and the correction apparatus 30.

The correlation information generation part 31 is a means for generating correlation information stored in the storage part 34, and is a processing module activated in the above-mentioned first phase. Specifically, the correlation information generation part 31 generates correlation information that includes information (angle of transmission and receiving antennas) related to antenna axes of the transmission and receiving antennas, and data (inter-mode interference pattern) related to actually measured inter-mode interference.

The correlation information generation part 31 is configured by including an antenna angle change part 401, and a transmission mode setting part 402, an inter-mode interference pattern generation part 403, and a correlation information recording part 404.

The antenna angle change part 401 is a means for instructing the transmission apparatus 10 and the receiving apparatus 20 to change antenna angles thereof. It is to be noted that antenna angles for which change is instructed are divided into an angle of the transmission antenna 15-1 of the transmission apparatus 10 (denoted below as transmission antenna angle), and an angle of the receiving antenna 25-2 of the receiving apparatus 20 (denoted below as receiving antenna angle).

Figure 6A:
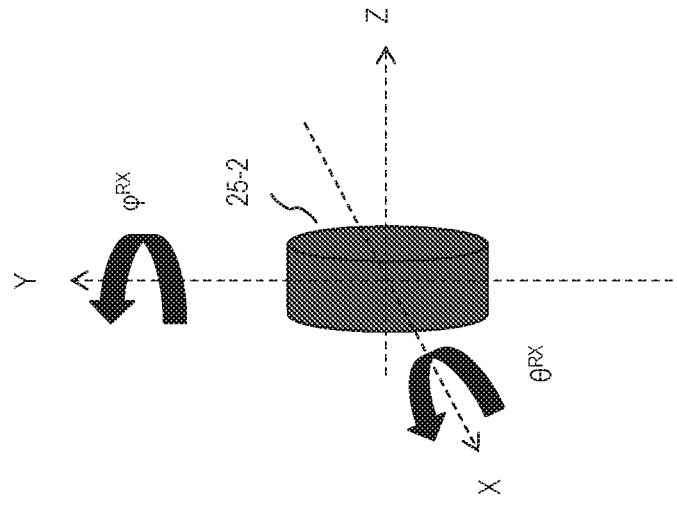
FIGS. 6A and 6B are diagrams for describing antenna angle.
Figure 6B:
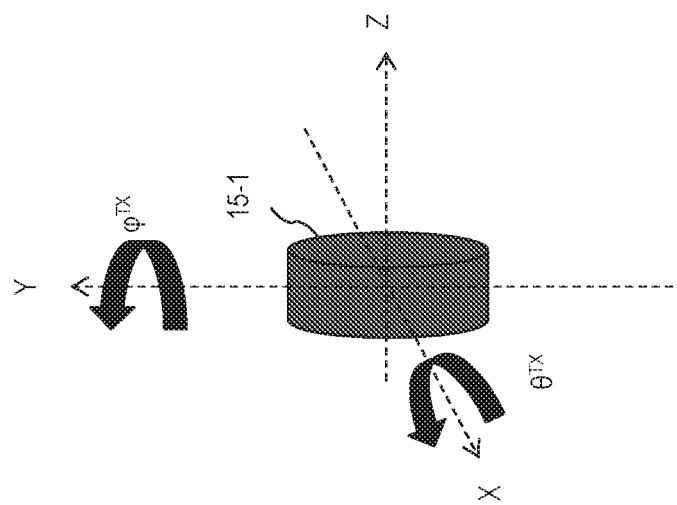

As shown in FIG. 6A, the transmission antenna angle is defined by rotation angle $\theta^{TX}$ of the transmission antenna 15-1 in X axis rotation, and rotation angle $\varphi^{TX}$ of the transmission antenna 15-1 in Y axis rotation. Similarly, as shown in FIG. 6B, the receiving antenna angle is defined by rotation angle $\theta^{RX}$ of the receiving antenna 25-2 in X axis rotation, and rotation angle $\varphi^{RX}$ of the receiving antenna 25-2 in Y axis rotation. It is to be noted that in the present document, right-hand rotation with respect to a rotational axis is a positive rotation direction, and left-hand rotation is a negative rotation direction.

In the first exemplary embodiment, a description is given such that, when 4 antenna rotational angles are 0.0 degrees, ($\theta^{TX}=0.0$, $\varphi^{TX}=0.0$, $\theta^{RX}=0.0$, $\varphi^{RX}=0.0$), transmission and receiving antenna axes are aligned, and inter-mode interference does not occur. It is to be noted that in the present document, if there is no special explanation, degrees are used as rotational angle units, and a description thereof is omitted.

The transmission mode setting part 402 is a means for setting a transmission mode when the transmission apparatus 10 transmits a signal stream. Specifically, the transmission mode setting part 402 selects 1 among a plurality of transmission modes that the transmission apparatus 10 can respond to, and instructs the transmission apparatus 10 to transmit an electromagnetic wave according to the selected transmission mode.

The inter-mode interference pattern generation part 403 is a means for generating an inter-mode interference pattern based on receiving power obtained from the receiving apparatus 20. The inter-mode interference pattern is information included in correlation information, and is information that characterizes inter-mode interference.

Figure 7:
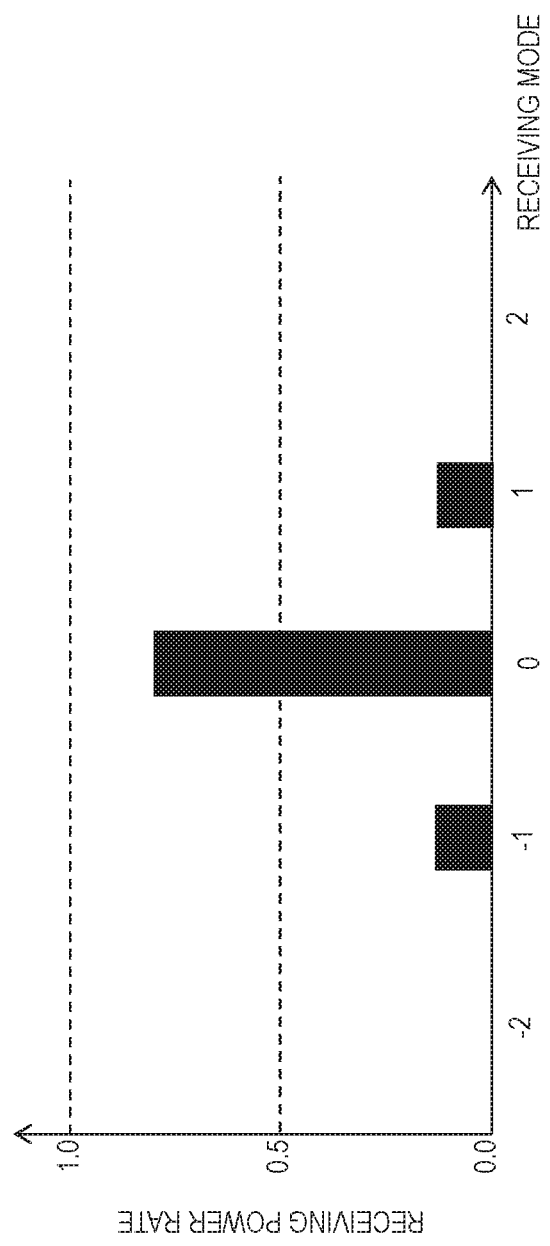
FIG. 7 is a diagram for describing an inter-mode interference pattern.

Referring to FIG. 7, when the transmission apparatus 10 transmits an electromagnetic wave in a single transmission mode (0), an electromagnetic wave is received in the receiving apparatus 20 not only in receiving mode (0), but also receiving mode (1) and receiving mode (−1). With this type of situation, the transmission apparatus 10 transmits an electromagnetic wave by transmission mode (0), and in the receiving apparatus 20 it can be said that inter-mode interference occurs due to an electromagnetic wave being received in receiving mode (−1) and receiving mode (1). Primarily, if the antenna angle is in an ideal state (rotation angles of antennas in the first exemplary embodiment are all zero), no inter-mode interference occurs. In this type of ideal environment, receiving power rate in receiving mode (0) is 1.0.

The inter-mode interference pattern generation part 403 generates, as an inter-mode interference pattern, a vector having as elements respective receiving power rates in a plurality of receiving modes produced by a particular transmission mode. More specifically, the inter-mode interference pattern generation part 403 computes the receiving power rate for each receiving mode obtained from the receiving apparatus 20 for receiving power in an ideal environment.

It is to be noted that the receiving power in an ideal environment is, for example, receiving power in a receiving mode (0) with respect to transmission mode (0), in a state where antenna angles are set such that no inter-mode interference is produced. This receiving power is stored in advance in the correction apparatus 30.

The inter-mode interference pattern generation part 403 arranges the computed receiving power rates in sequence, and generates an inter-mode interference pattern. For example, in the example of FIG. 7, receiving power rate in receiving mode (−2) is 0, receiving power rate in receiving mode (−1) is 0.1, receiving power rate in receiving mode (0) is 0.8, receiving power rate in receiving mode (1) is 0.1, receiving power rate in receiving mode (2) is 0, so that (0, 0.1, 0.8, 0.1, 0) is obtained as inter-mode interference pattern.

The inter-mode interference pattern generation part 403 stores the generated inter-mode interference pattern in the storage part 34 temporarily. It is to be noted that respective elements of the inter-mode interference pattern may clearly use not only an expression according to true values of the receiving power rate, but also may use a decibel expression.

The correlation information recording part 404 is a means for generating correlation information using the inter-mode interference pattern, and storing in the storage part 34. The correlation information recording part 404 generates "correlation information" by combining antenna angle instructed to the transmission apparatus 10 and the receiving apparatus 20, transmission mode set in the transmission apparatus 10, and inter-mode interference pattern computed at the time of transmission mode.

Figure 8:
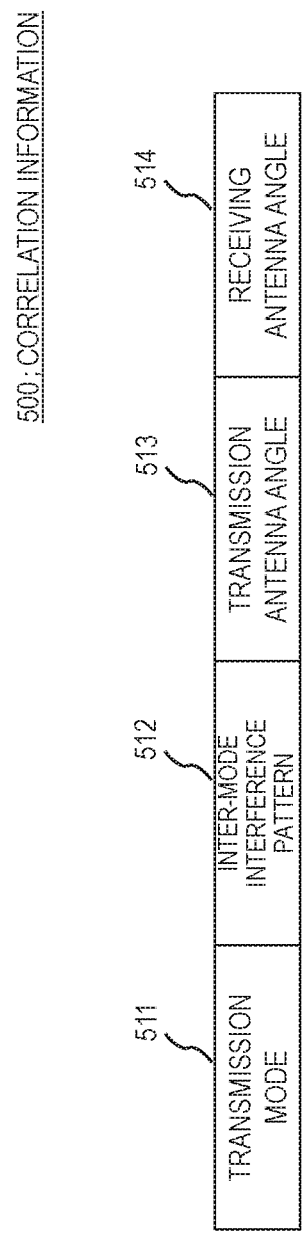
FIG. 8 is a diagram showing an example of correlation information.

FIG. 8 is a diagram showing an example of correlation information. As shown in FIG. 8, the correlation information 500 is information that is a set of transmission mode 511, inter-mode interference pattern 512, transmission antenna angle 513, and receiving antenna angle 514. One set in the direction of FIG. 9 to FIG. 12 shown below forms 1 correlation information item (1 data set).

Figure 9:
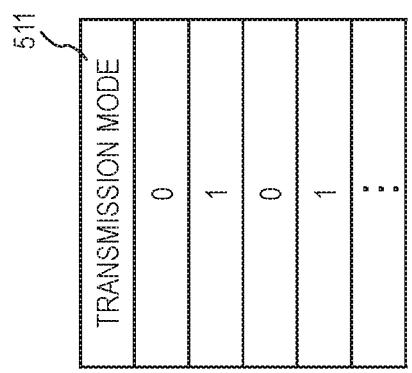
FIG. 9 is a diagram for describing transmission mode in the correlation information.

Information related to transmission mode as shown in FIG. 9 is stored in transmission mode 511 of correlation information 500. An inter-mode interference pattern as shown in FIG. 10 is stored in inter-mode interference pattern 512 of the correlation information 500. It is to be noted that 5 receiving modes (−2, −1, 0, 1, 2) are selected as elements configuring the inter-mode interference pattern, but there is no intention to limit the selection of receiving mode. In the disclosure of the present application, there is no limitation to combination of transmission mode and receiving mode measuring an inter-mode interference pattern, and FIG. 9 and FIG. 10 are examples.

As shown in FIG. 11, transmission antenna angles ($\theta^{TX}$, $\varphi^{TX}$) are stored in the transmission antenna angle 513 of the correlation information 500. Similarly, as shown in FIG. 12, receiving antenna angles ($\theta^{RX}$, $\varphi^{RX}$) are stored in the receiving antenna angle 514 of the correlation information 500.

The correlation information recording part 404 stores data related to the abovementioned correlation information in the storage part 34.

Figure 13:
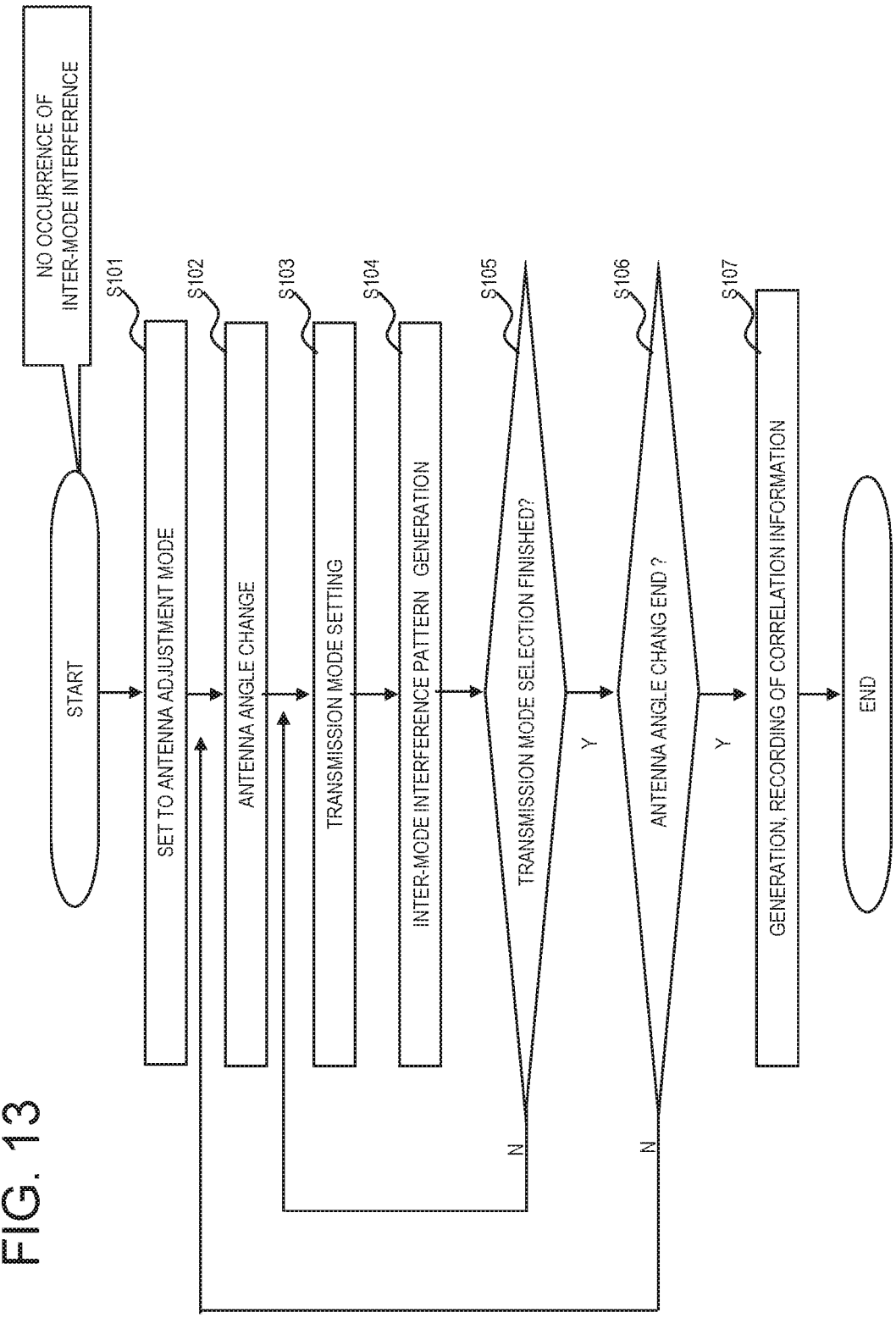
FIG. 13 is a flowchart showing an example of operations of a correlation information generation part.
Figure 16:
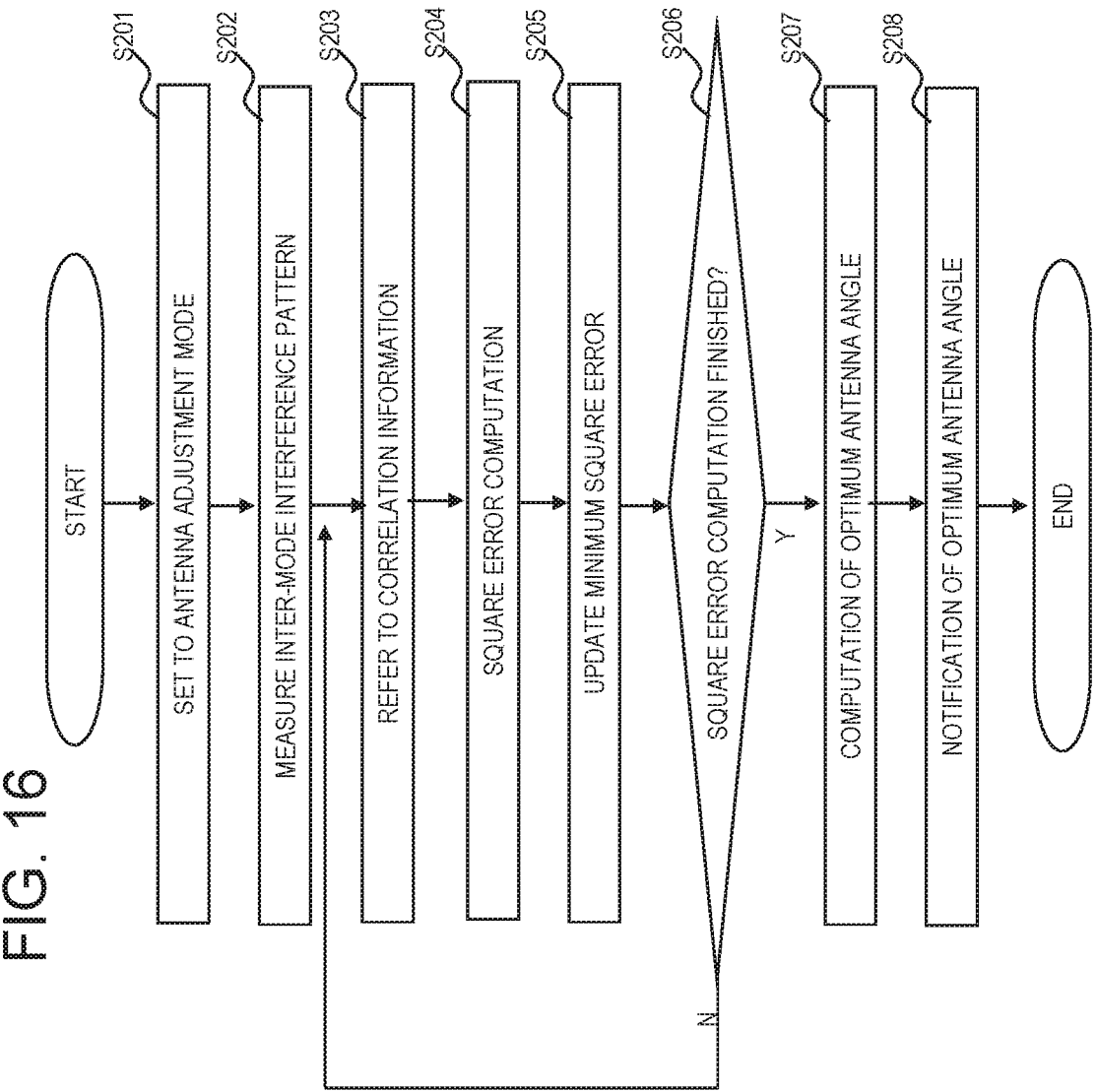
FIG. 16 is a flowchart showing an example of operations of an antenna axis correction part.

Next, a description is given of operations of the correlation information generation part 31, making reference to FIG. 13.

It is to be noted that, before generating correlation information, the antenna angles of the transmission apparatus 10 and the receiving apparatus 20 are set in a state where, as much as possible, no inter-mode interference is produced. In calibration before operation of the radio communication system communication, for example, antenna angles are normally set in an ideal state where no inter-mode interference occurs, by a search type antenna angle adjustment method disclosed in NPL 4. Generation of correlation information by the correlation information generation part 31 is executed in this type of ideal state. It is to be noted that, as described above, for convenience in the description the rotation angles of antennas set in an ideal state (a state where no inter-mode interference occurs) are all 0.0.

The correlation information generation part 31 instructs the transmission apparatus 10 and the receiving apparatus 20 to transition to an antenna adjustment (step S101).

In step S102, the antenna angle change part 401 instructs the transmission apparatus 10 and receiving apparatus 20 to change antenna angle, in order to have a desired antenna angle. Specifically, the antenna angle change part 401 instructs the transmission apparatus 10 to change antenna angle of the transmission antenna 15-1. The antenna angle change part 401 instructs the receiving apparatus 20 to change antenna angle of the receiving antenna 25-2. It is to be noted that in the first exemplary embodiment, the specification of antenna angle by the antenna angle change part 401 uses change amount from the antenna angle at the time of antenna adjustment mode transition. For example, with respect to the transmission antenna 15-1, for 0.1 right-hand rotations about X axis, and 0.2 left-hand rotations about Y axis, the correction apparatus 30 gives notification of transmission antenna angles ($\theta^{TX}$, $\varphi^{TX}$)=(0.1, −0.2) to the transmission apparatus 10.

The antenna angle change part 401, for example, gives an instruction related to antenna angle change to the transmission apparatus 10 and the receiving apparatus 20, in accordance with table information stored in advance in the storage part 34. In a case where table information as shown in FIG. 14 is stored in the storage part 34, the antenna angle change part 401 instructs the transmission apparatus 10 and the receiving apparatus 20 in order to have an antenna angle specified by an index k (k is a positive integer; the same applies below). For example, in a case where the index k=1, the instruction is such that the transmission antenna 15-1 of the transmission apparatus 10 rotates 0.1 degrees in a right-hand rotation about the X axis.

In step S103, the transmission mode setting part 402 performs setting of transmission mode in the transmission apparatus 10. The transmission mode setting part 402, for example, determines transmission mode of signal stream transmitted by the transmission apparatus 10, in accordance with the table information stored in advance in the storage part 34.

Figure 15:
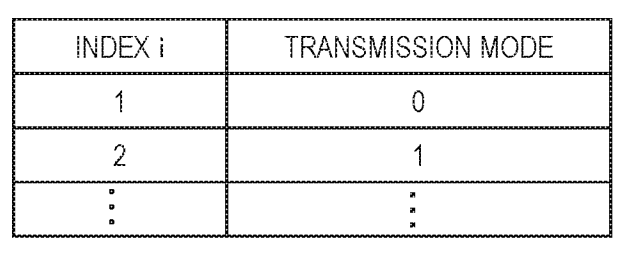

The transmission mode setting part 402, for example, refers to table information as shown in FIG. 15 stored in the storage part 34, and sets transmission mode in the transmission apparatus 10, in accordance with an index i (i is a positive integer). The transmission apparatus 10 in which transmission mode has been set, converts a signal stream to an electromagnetic wave in accordance with the set transmission mode, and performs transmission. The receiving apparatus 20 that receives the electromagnetic wave converts the electromagnetic wave received in a plurality of receiving modes to a signal sequence, and transmits receiving power of the signal sequence converted in the respective modes to the correction apparatus 30.

In step S104, the inter-mode interference pattern generation part 403 uses receiving power of each receiving mode obtained from the receiving apparatus 20, to generate inter-mode interference patterns.

In step S105, the transmission mode setting part 402 judges whether or not necessary transmission mode setting has finished. If the necessary setting has not finished (step S105, No branch), control returns to step S103 and processing of the transmission node setting and what follows is repeated.

If the necessary setting has finished (step S105, Yes branch), the antenna angle change part 401 judges whether or not a necessary antenna angle change has finished. If the necessary change has not finished (step S106, No branch), control returns to step S102 and processing of the antenna angle change and what follows is repeated. If the necessary change has finished (step S106, Yes branch), control transitions to step S107.

In step S107, the correlation information recording part 404 generates correlation information by combining antenna angle (transmission antenna angle, receiving antenna angle) for which a change has been instructed in step S102, transmission mode set in step S103, and inter-mode interference pattern generated in step S104.

In more detail, the correlation information recording part 404 records the transmission mode and antenna angle set by the antenna angle change part 401, associating the abovementioned index k and index i, and the inter-mode interference pattern computed by the inter-mode interference pattern generation unit 403, as correlation information, in the recording part 34. It is to be noted that the correlation information recording part 404 may focus on correlation information to be stored, rather than store all generated correlation information in the recording part 34.

Returning to the description in FIG. 5, the antenna axis correction part 32 is a processing module activated in the abovementioned second phase (correction of antenna axis using correlation information).

The antenna axis correction part 32 is configured to include an inter-mode interference pattern measuring part 411, an optimum antenna angle computing part 412, and an optimum antenna angle notification part 413.

The inter-mode interference pattern measuring part 411 is a means for measuring an inter-mode interference pattern based on receiving power for each receiving mode obtained from the receiving apparatus 20. Processing related to measuring the pattern in question by the inter-mode interference pattern measuring part 411 may be the same as processing of the inter-mode interference pattern generation part 403, and a description thereof is omitted.

The optimum antenna angle computing part 412 is a means for computing optimum antenna angle notified to the transmission apparatus 10 and the receiving apparatus 20, based on inter-mode interference pattern measured by the inter-mode interference pattern measuring part 411.

The optimum antenna angle notification part 413 is a means for setting (notifying) the abovementioned computer optimum antenna angle in the transmission apparatus 10 and the receiving apparatus 20.

Next, a description is given of operations of the antenna axis correction part 32, giving notification to the transmission apparatus 10 and the receiving apparatus 20 of the optimum antenna angle from the measured inter-mode interference pattern.

In step S201, the antenna axis correction part 32 makes the transmission apparatus 10 and the receiving apparatus 20 transition to the antenna adjustment mode.

In step S202, the inter-mode interference pattern measuring part 411 measures the inter-mode interference pattern for each transmission mode.

For example, the inter-mode interference pattern measuring part 411 instructs the transmission apparatus 10 to transmit a signal stream using a single transmission mode, and measures inter-mode interference pattern based on receiving power separated in respective modes, from the receiving apparatus 20. Thereafter, the inter-mode interference pattern measuring part 411 instructs the transmission apparatus 10 to transmit a signal stream using the next transmission mode, and repeats measuring the inter-mode interference pattern based on receiving power that has been received.

Alternatively, the inter-mode interference pattern measuring part 411 may instruct the transmission apparatus 10 to transmit by switching among a plurality of transmission modes in a time-based manner, and indirectly measure inter-mode interference patterns according to difference in receiving power separated in respective modes, from the receiving apparatus 20. That is, in the disclosure of the present application, it is possible to use a method of measuring various types of inter-mode interference pattern. The inter-mode interference pattern measuring part 411 stores the inter-mode interference pattern for each transmission mode that has been measured, in the storage part 34.

The optimum antenna angle computing part 412 accesses the storage part 34, and obtains the stored correlation information (data set of inter-mode interference pattern and antenna angle). Thereafter, the optimum antenna angle computing part 412 sequentially refers to the content of the correlation information (step S203). It is to be noted that the number of correlation information items referred to is N (N is a positive integer).

The optimum antenna angle computing part 412 computes square error I (L, M) between measured inter-mode interference pattern and inter-mode interference pattern stored in the database, based on expression (1) described below (step S204).

$$I(L,M)=\Sigma_{k\in L}\Sigma_{m\in M}(P_m^d(k)-P_m^s(k))^2 \tag{1}$$

It is to be noted that in expression (1), denotation $P_m^d(k)$ is used for receiving power rate where transmission mode (k) for the measured inter-mode interference pattern is received as receiving mode (m, where m is a positive integer; the same applies below) by the receiving apparatus 20. Similarly, denotation $P_m^s(k)$ is used for receiving power rate of inter-mode interference pattern stored in the storage part 34. In expression (1), the number of transmission modes is the elements of set L (L is an integer greater than or equal to 2; the same applies below), and the number of receiving modes is the elements of set M (M is an integer equal to 3 or more; the same applies below).

In the first exemplary embodiment the number of elements of set L is 2 or more, the number of elements of set M is 3 or more, and the number of elements of set M is larger than the number of elements of set L. The above described conditions are set so as to avoid deterioration in accuracy extracting information related to antenna angle from the inter-mode interference patterns.

Next, the optimum antenna angle computation part 412 compares computed square error and already computed square error, and stores the smaller square error as minimum square error along with corresponding antenna angle (antenna angle obtained from correlation information used in computing the square error) (step S205).

In step S206, a judgement is made as to whether or not computation is finished for square error related to the inter-mode interference pattern measured in step S202. That is, a judgement is made as to whether or not computation is finished for square error between the measured inter-mode interference pattern and N items of correlation information stored in the storage part 34.

When all the square error computations are finished (step S206, Yes branch), the antenna angle with smallest square error is identified. Specifically, the antenna angle is obtained by the following expression (2).

$$(\theta_{min}^{TX}, \phi_{min}^{TX}, \theta_{min}^{RX}, \phi_{min}^{RX}) = \underset{(\theta^{TX}, \phi^{TX}, \theta^{RX}, \phi^{RX})}{\mathrm{argmin}} I(L, M) \quad (2)$$

It is to be noted that in expression (2), identified transmission antenna angles are denoted as $\theta^{TX}min$, $\varphi^{TX}min$, and receiving antenna angles are denoted $\theta^{RX}min$, $\varphi^{RX}min$.

When the antenna angle with the smallest square error is identified, the optimum antenna angle computation part 412 obtains the optimum antenna angle to be notified to the transmission apparatus 10 and the receiving part 20 using the antenna angle in question (step S207). Specifically, the optimum antenna angle computation part 412 computes the optimum antenna angle so that the antenna angles of the transmission apparatus 10 and the receiving apparatus 20 have ideal angles (that is, all angles are 0.0). For example, if the antenna angles with smallest square error are ($\theta^{TX}min$, $\varphi^{TX}min$, $\theta^{RX}min$, $\varphi^{RX}min$)=(0.2, 0.0, 0.0, 0.0), the optimum antenna angle computation part 412 computes (−0.2, 0.0, 0.0, 0.0) as optimum angles ($\theta^{TX}opt$, $\varphi^{TX}opt$, $\theta^{RX}opt$, $\varphi^{RX}opt$). In this way, the optimum antenna angle computation part 412 computes an angle by which the antenna angle with the smallest square error is rotated in reverse, as the optimum antenna angle.

The optimum antenna angle notification part 413 gives notification of the abovementioned computed optimum antenna angle to the transmission apparatus 10 and the receiving apparatus 20 (step S208).

As described above, the correction apparatus 30 identifies, from among plural correlation information items, the inter-mode interference pattern most similar to the inter-mode interference pattern measured from an electromagnetic wave transmitted by the transmission apparatus 10 to the receiving apparatus 20. Thereafter, the correction apparatus 30 corrects the antenna angles of the transmission apparatus 10 and the receiving apparatus 20, based on the antenna angles (antenna angles with smallest square error) of the transmission apparatus 10 and the receiving apparatus 20 corresponding to the identified inter-mode interference pattern.

[Collecting of Correlation Information]

As described above, the correction apparatus 30 is provided with the storage part 34 that stores correlation information. The operation provider of the radio communication system has to collect the abovementioned correlation information using various means, and to store the collected correlation information in the storage part 34. A method of generating the correlation information described using FIG. 13 and the like, is one of the methods of collecting multiple correlation information.

Outside of generation of the abovementioned correlation information, correlation information may be generated by electromagnetic field simulation by computer or experiment using a real machine, and stored in the storage part 34. That is, collection of the correlation information stored in the storage part 34 may be considered for a case of measuring at a real site (a case described using FIG. 13 or the like) and a case of measuring in advance by experiment or computer.

Since operations in the case where correlation information is actually measured on site have been described using FIG. 13, a description is given concerning the case where correlation information is measured in advance by a computer or the like. However, the case where the correlation information is measured in advance by a computer has basically the same procedure as the case of actually measuring on site.

That is, correlation information according to the flow shown in FIG. 13 is generated, computation of receiving power obtained in accordance with change of antenna angle is performed by simulation in which the transmission apparatus and the receiving apparatus are modelled, and the correlation information is generated. Specially, collection of correlation information is performed by simulation with conditions of frequency band used in OAM system, distance between transmission and receiving antennas, antenna shape and size, and antenna angles of the transmission and receiving antennas. It is to be noted that in a case of collecting (advance preparation) correlation information by simulation by a computer or the like, the correlation information generation part 31 of the correction apparatus 30 is not necessary.

If conditions of the used frequency bands and antenna shape match, correlation information may also be substantively considered to match. Therefore, the correlation information collected by simulation or the like can be generically used, and the correlation information can be made into a database and managed. In this case, for example, when antenna angles (antenna rotation angle) of the transmission apparatus 10 and the receiving apparatus 20 are adjusted, an operator confirms a screen (setting screen for data reference parameters) as shown in FIG. 17. Thereafter, the operator may refer to suitable data matching the installation and usage conditions of the transmission apparatus 10 and the receiving apparatus 20, to store in the storage part 34.

[Overall Operations of the Radio Communication System]

Next, a description is given of operations of the radio communication system concerning the first phase in which the correlation information is collected in advance.

Figure 18:
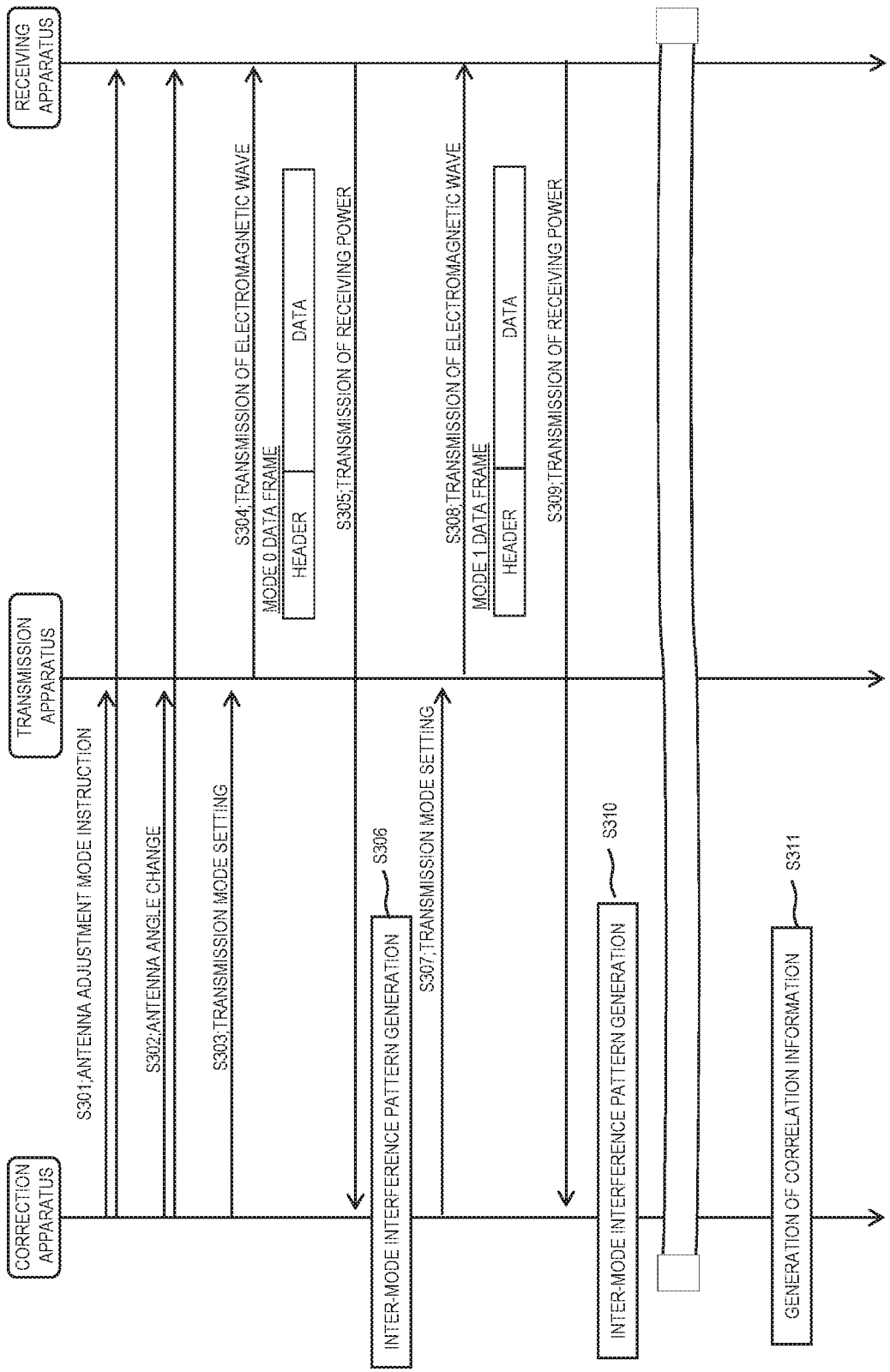
FIG. 18 is a sequence diagram showing an example of operations of the radio communication system according to the first exemplary embodiment.

FIG. 18 is a sequence diagram showing an example of operations of the radio communication system according to the first exemplary embodiment.

The correction apparatus 30 instructs the transmission apparatus 10 and the receiving apparatus 20 to transition to an antenna adjustment mode (step S301).

The correction apparatus 30 respectively instructs the transmission apparatus 10 with regard to angle change of the transmission antenna 15-1, and the receiving apparatus 20 with regard to angle change of the receiving antenna 25-2 (step S302).

The correction apparatus 30 sets the transmission mode in the transmission apparatus 10 (step S303). The transmission apparatus 10 in which transmission mode has been set, transmits an electromagnetic wave according to the OAM system in the transmission mode that has been set, to the receiving apparatus 20. In the example of FIG. 18, frame transmission using transmission mode (0) directed from the transmission apparatus 10 to the receiving apparatus 20, is performed.

The receiving apparatus 20 transmits the receiving power for each receiving mode to the correction apparatus 30 (step S305).

The correction apparatus 30 computes receiving power rate for each receiving mode, based on the receiving power in question, and generates inter-mode interference patterns (step S306).

Thereafter, transmission mode setting (step S307), inter-mode interference pattern generation (step S301), antenna angle changing and the like are repeated.

When a required change of antenna angle and setting of transmission mode are finished, the correction apparatus 30 generates correlation information (step S311), and the information in question is stored in the storage part 34.

Next, a description is given concerning the second phase in which antenna axis is corrected using the correlation information.

Figure 19:
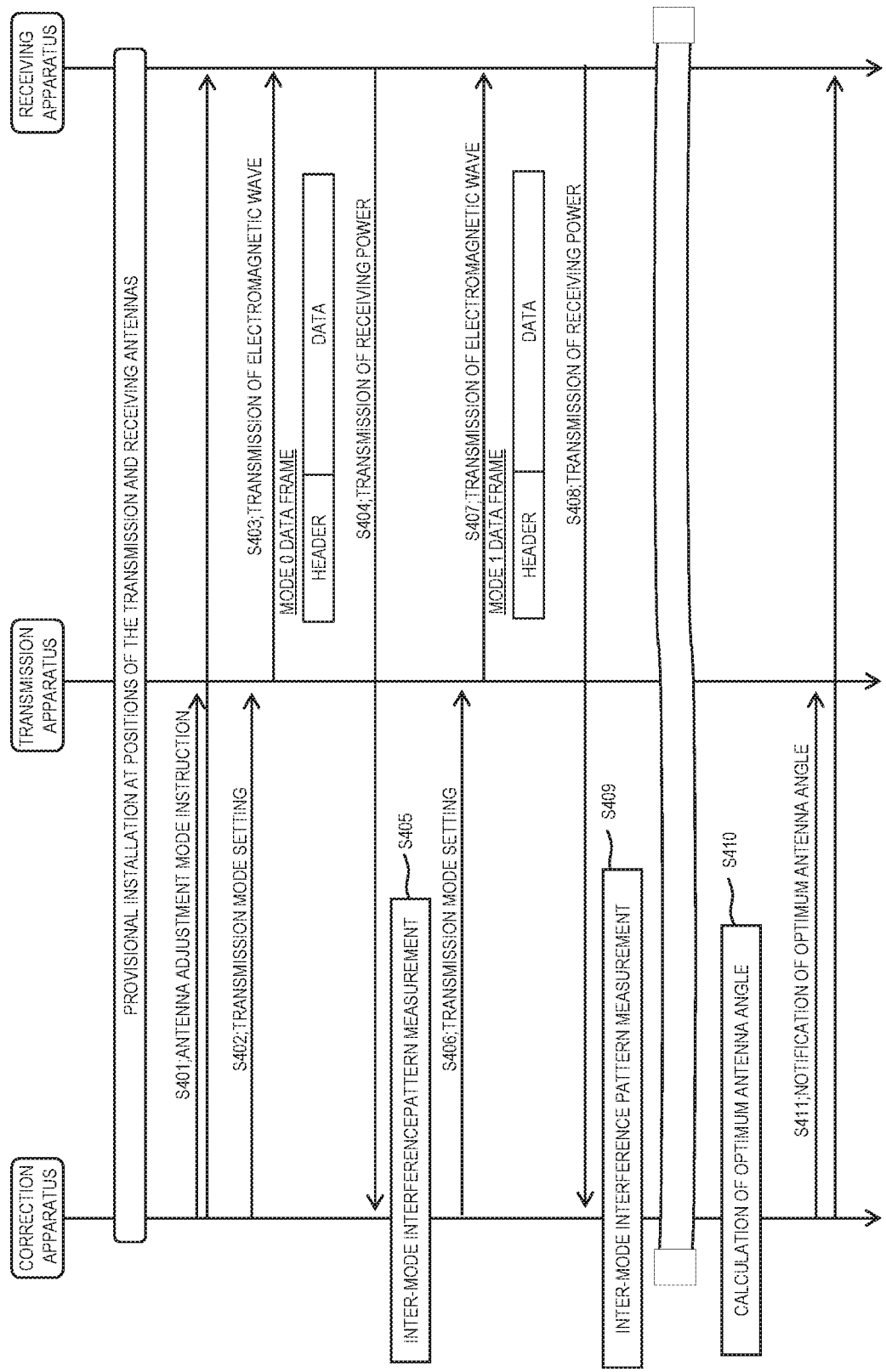
FIG. 19 is a sequence diagram showing an example of operations of the radio communication system according to the first exemplary embodiment.

FIG. 19 is a sequence diagram showing an example of operations of the radio communication system according to the first exemplary embodiment. The sequence diagram shown in FIG. 19 illustrates operations in a case (abovementioned first case) where the transmission apparatus 10 and the receiving apparatus 20 are installed on site.

If the transmission apparatus 10 and the receiving apparatus 20 are installed on site, for example, transmission and receiving antennas are provisionally installed (temporarily installed) at a location such that receiving power in mode 0 is maximum. The object of the provisional installation is to have a suitable value included in a search range for antenna angle using the correlation information stored in the storage part 34.

When the antenna provisional installation is finished, setting of transmission mode (step S402) is performed for the transmission apparatus 10 by the correction apparatus 30, and transmission of an electromagnetic wave according to the set transmission mode is performed (step S403).

Thereafter, receiving power for each receiving mode is transmitted to the correction apparatus 30 from the receiving apparatus 20 (step S404), and the correction apparatus 30 measures the inter-mode interference pattern (step S405).

The abovementioned type of processing is performed for each transmission mode, while keeping constant the antenna angles of the transmission and receiving antennas, and computation of optimum antenna angle is performed (step S410).

When the optimum antenna angle is computed, the correction apparatus 30 gives notification of the optimum antenna angle to the transmission apparatus 10 and the receiving apparatus 20 (step S411). Specifically, the correction apparatus 30 gives notification of information ($\theta^{TX}$opt, $\varphi^{TX}$opt) of the optimum transmission antenna angle to the transmission apparatus 10. The transmission apparatus 10 changes the angle of the transmission antenna 15-1, based on the notified transmission antenna angle. For example, as described above, in a case of computing (−0.2, 0.0, 0.0, 0.0) as the optimum antenna angles ($\theta^{TX}$opt, $\varphi^{TX}$opt, $\theta^{RX}$opt, $\varphi^{RX}$opt), the optimum transmission antenna angles ($\theta^{TX}$opt, $\varphi^{TX}$opt)=(−0.2, 0.0) are notified to the transmission apparatus 10. Since the notified optimum transmission antenna angles indicate rotational amount from current antenna angle, the transmission apparatus 10 rotates the transmission antenna 15-1 rotates 0.2 times in a left-handed rotation about the X axis.

Similarly, the correction apparatus 30 gives notification of information ($\theta^{RX}$opt, $\varphi^{RX}$opt) of the optimum transmission antenna angle to the receiving apparatus 20. The receiving apparatus 20 changes the angle of the receiving antenna 25-2, based on the notified receiving antenna angle.

Figure 20:
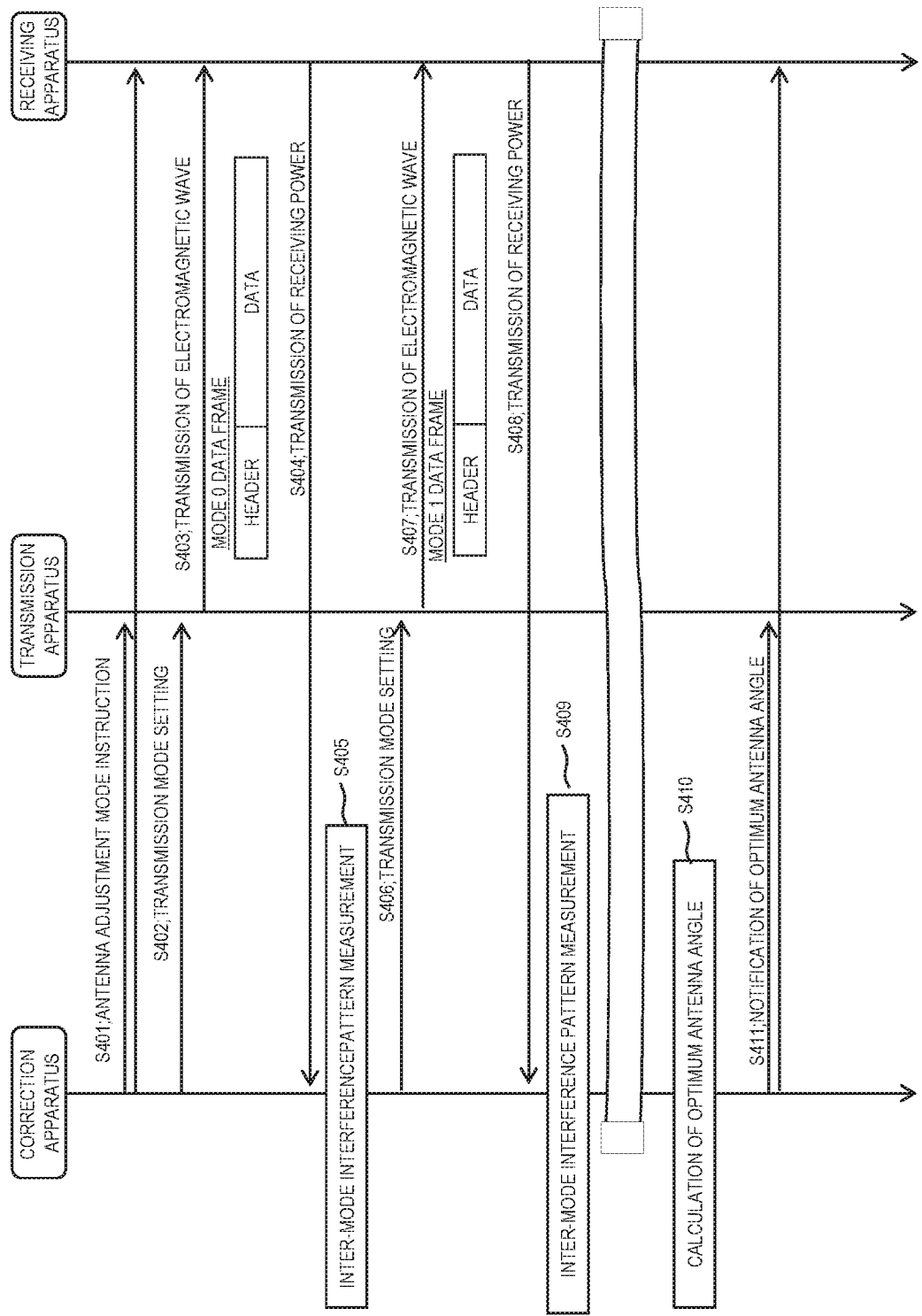
FIG. 20 is a sequence diagram showing an example of operations of the radio communication system according to the first exemplary embodiment.

FIG. 20 is a sequence diagram showing an example of operations of the radio communication system according to the first exemplary embodiment. The sequence diagram shown in FIG. 20 illustrates operations in a case (abovementioned second case) where the transmission apparatus 10 and the receiving apparatus 20 are actually operated. A point of difference between FIG. 19 and FIG. 20 is that a "provisional installation of installation positions of the transmission and receiving antennas" shown in FIG. 19 is not present in FIG. 20. Therefore, a detailed description of FIG. 20 is omitted.

Figure 21:
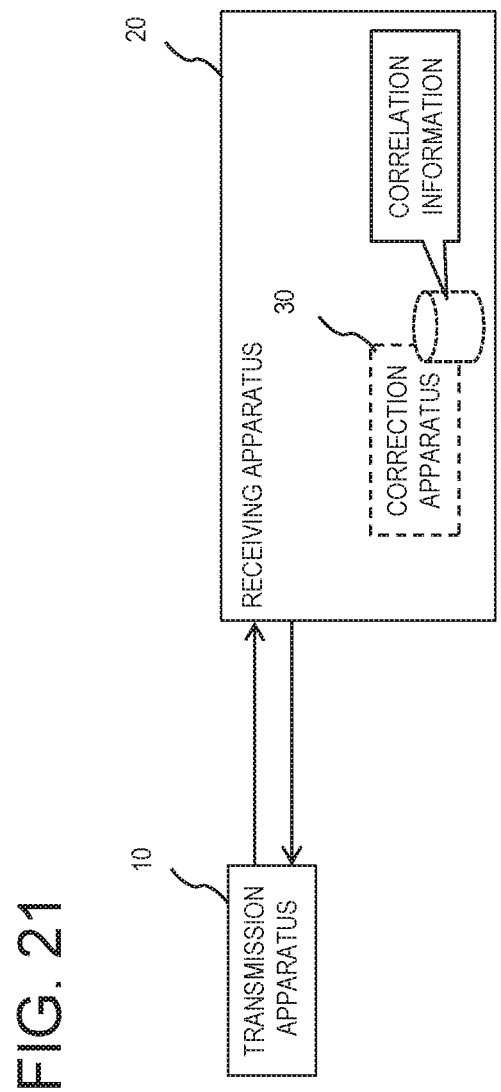
FIG. 21 is a block diagram showing a modified example of the radio communication system according to the first exemplary embodiment.

It is to be noted that the configuration of the radio communication system described in the abovementioned exemplary embodiment is exemplary, and there is no limitation to the configuration of the system. For example, as shown in FIG. 21, functionality of the correction apparatus 30 may be built in internally in the receiving apparatus 20. In this case, the transmission apparatus 10 and the receiving apparatus 20 operate in coordination, measure inter-mode interference patters regularly, and it is possible to confirm whether a misalignment occurs in the transmission and receiving antennas. If a misalignment occurs in the transmission and receiving antennas, the receiving apparatus 20 can correct its own antenna axis, and can give an instruction for antenna axis correction to the transmission apparatus 10. Alternatively, the receiving apparatus 20 can give notification of misalignment of transmission and receiving antennas to a management site of the radio communication system, and can request appropriate action.

Figure 22A:
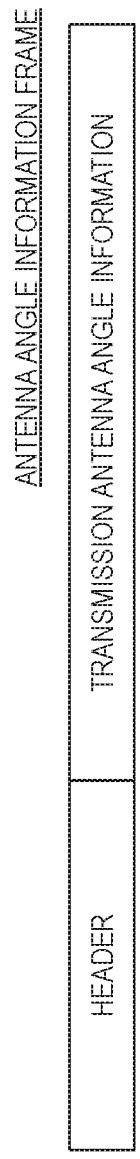
FIGS. 22A and 22B are diagrams showing an example of a frame sent by a receiving apparatus to a transmission apparatus.
Figure 22B:
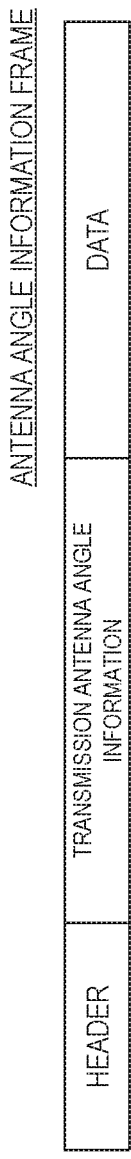

In a case where functionality of the correction apparatus 30 is built into the receiving apparatus 20, when an optimum antenna angle is notified from the receiving apparatus 20 to the transmission apparatus 10, it is possible to use an antenna angle information frame as shown in FIG. 22A. Information of the optimum transmission antenna angle is stored in the frame transmitted to the transmission apparatus 10. The frame in question may be configured with a header part and a data part, but there is no particular need for a limitation. For example, in order to prevent deterioration in reception quality, data may be added to a latter stage of the antenna angle information as shown in FIG. 22B.

In the abovementioned exemplary embodiment, the antenna axis change (antenna axis correction) is described as being realized by changing the antenna angle. However, the antenna axis change is not limited to the antenna angle, and for example, the antenna axis correction may be corrected by another means as in a parallel shift of the antenna.

In the abovementioned exemplary embodiment, receiving power rate is used in each receiving mode, as a constituent element of inter-mode interference pattern characterizing the inter-mode interference, but it is also possible to use another indicator. For example, SN ratio (Signal to Noise Ratio) for each receiving mode may be used as a constituent element of an inter-mode interference pattern. That is, as long as there is an indicator to characterize inter-mode interference, any type of indicator may be used.

In the abovementioned exemplary embodiment, a description has been given of a case of correcting antenna angles of the transmission antenna 15-1 of the transmission apparatus 10, and the receiving antenna 25-2 of the receiving apparatus 20, but in a case of correcting the antenna angles of the receiving antenna 15-2 of the transmission apparatus 10, and the transmission antenna 25-1 of the receiving apparatus 20, the abovementioned described procedure with the transmission and receiving sides switched, may be executed.

As described above, in the radio communication system according to the first exemplary embodiment, inter-mode interference patterns characterizing inter-mode interference are collected at various antenna angles (first phase). Thereafter, when a correction to an antenna angle becomes necessary, the inter-mode interference pattern of the antenna angle in the current state is measured, and antenna angle and inter-mode interference pattern matching the abovementioned measured inter-mode interference pattern among the correlation information collected in advance, are identified. Since the identified antenna angle can be taken as a misalignment (change amount from ideal antenna angle) of antenna angle due to the effect of shaking or the like, the correction apparatus 30 corrects the antenna angles of the transmission apparatus 10 and the receiving apparatus 20 so as to cancel the antenna angle change (second phase).

Figures 23A, 23B, 23C:
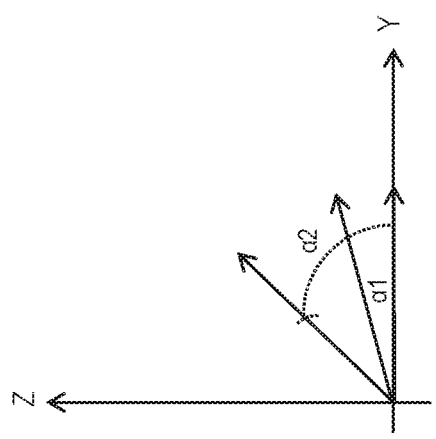
FIGS. 23A, 23B and 23C are diagrams for describing operations of the radio communication system according to the first exemplary embodiment.

For example, as shown in FIGS. 23A and 23B, inter-mode interference patterns for settings to various antenna angles are collected in advance. It is to be noted that in FIGS. 23A to 23C, to facilitate understanding the illustration is limited to antenna rotational angle about the X axis.

In a case where the antenna angle is 0.0, since this is an ideal environment, there is no inter-mode interference (the receiving power rate of the corresponding receiving mode is 1). However, if the antenna angles are $\propto 1$, $\propto 2$, since the state deviates from an ideal environment, inter-mode interference occurs. In the first exemplary embodiment, the inter-mode interference generated is quantified according to the inter-mode interference pattern, and collected in advance. As a result, sets of correlation information as shown in FIG. 23B are accumulated internally in the correction apparatus 30.

If antenna correction is necessary, the inter-mode interference pattern for the antenna angle in the current state is measured. For example, the inter-mode interference pattern shown in FIG. 23C is measured. The correction apparatus 30 identifies an antenna angle corresponding to inter-mode interference pattern substantively matching the measured inter-mode interference pattern. In the example of FIG. 23, the antenna angle $\propto 1$ of line 2 is identified. Since the identified antenna angle can be taken as a change amount from the ideal environment (in the disclosure of the present application, antenna angle is 0.0), by moving the antenna so as to cancel the change amount, it is possible to inhibit the occurrence of inter-mode interference. In the example of FIGS. 23A to 23C, a rotation of angle $\propto 1$ in a right-hand rotation from the current antenna angle is made and the antenna axis is corrected to be equivalent to an ideal environment (antenna angle is 0.0).

As described above, by using the correlation information stored internally, the correction apparatus 30 can estimate the optimum antenna angle from the actually measured inter-mode interference pattern. As a result, for example, in comparison with the search type antenna axis correction method as disclosed in NPL 4, it is possible to perform antenna axis correction with less transmitting and receiving.

According to the abovementioned description, the industrial applicability of the present invention is clear, and the present invention can be preferably applied to communication systems that are provided with the OAM system.

Some or all of the abovementioned exemplary embodiments may also be described as in the following modes (formulations), but there is no limitation to the following.

<First Mode>

As in the radio communication system according to the first aspect described above.

<Second Mode>

The radio communication system preferably according to the first mode, wherein antenna related information in the correlation information is information related to antenna angles of the transmission apparatus and the receiving apparatus, and the correction apparatus corrects the antenna angle of the transmission apparatus and the receiving apparatus, based on the correlation information.

<Third Mode>

The radio communication system preferably according to the second mode, wherein the correction apparatus identifies from among the plural correlation information items, an inter-mode interference pattern similar to the inter-mode interference pattern measured from an electromagnetic wave transmitted by the transmission apparatus to the receiving apparatus, and corrects the antenna angles of the transmission apparatus and the receiving apparatus, based on the antenna angles of the transmission apparatus and the receiving apparatus corresponding to the identified inter-mode interference pattern.

<Fourth Mode>

The radio communication system preferably according to the third mode, wherein the correction apparatus, by computing square error between respective inter-mode interference patterns of the plural correlation information, and the measured inter-mode interference pattern, identifies an inter-mode interference pattern similar to the measured inter-mode interference pattern.

<Fifth Mode>

The radio communication system preferably according to any 1 of the first to fourth modes, wherein the inter-mode interference pattern is from information related to receiving power of a signal stream in a plurality of receiving modes produced by a single transmission mode.

<Sixth Mode>

The radio communication system preferably according to the fifth mode, wherein the correction apparatus instructs the transmission apparatus to transmit an electromagnetic wave by specifying antenna angle and transmission mode, specifies an antenna angle to the receiving apparatus, transmits receiving power for each receiving mode of received signal stream to the correction apparatus, and generates the correlation information using the antenna angle instructed to the transmission apparatus and the receiving apparatus, and the inter-mode interference pattern computed from the receiving power for each of the receiving modes that have been transmitted.

<Seventh Mode>

The radio communication system preferably according to any 1 of the first to fifth modes, wherein the correlation information is generated by simulation by a computer.

<Eighth Mode>

The radio communication system preferably according to any 1 of the first to fifth modes, wherein for the correlation information, the number of transmission modes is 2 or more, the number of receiving modes is 3 or more, and the number of receiving modes is larger than the number of transmission modes.

<Ninth Mode>

As in the receiving apparatus according to the second aspect described above.

<Tenth Mode>

As in the correction apparatus according to the third aspect described above.

<Eleventh Mode>

As in the antenna correction method according to the fourth aspect described above.

<Twelfth Mode>

As in the program according to the fifth aspect described above. It is to be noted that the ninth to twelfth modes may be extended with regard to the second to eighth modes, similar to the first mode.

It is to be noted that the various disclosures of the cited Patent Literature described above are incorporated herein by reference thereto. Modifications and adjustments of exemplary embodiments and examples may be made within the bounds of the entire disclosure (including the scope of the claims) of the present invention, and also based on fundamental technological concepts thereof. Various combinations and selections of various disclosed elements (including respective elements of the respective claims, respective elements of the respective exemplary embodiments and examples, respective elements of the respective drawings, and the like) are possible within the scope of the entire disclosure of the present invention. That is, the present invention clearly includes every type of transformation and modification that a person skilled in the art can realize according to the entire disclosure including the scope of the claims and to technological concepts thereof. In particular, with regard to numerical ranges described in the present specification, arbitrary numerical values and small ranges included in the relevant ranges should be interpreted to be specifically described even where there is no particular description thereof.

What is claimed is:

1. A radio communication system, in which an electromagnetic wave having Orbital Angular Momentum (OAM) is used, the system comprising:
   a transmission apparatus that transmits the electromagnetic wave signal by a transmitting antenna;
   a receiving apparatus that receives the electromagnetic wave signal by a receiving antenna; and
   a correction apparatus that corrects antenna axes of the transmitting and receiving antennas, based on first correlation information that associates second information related to the transmitting and receiving antennas, and an inter-mode interference pattern that characterizes interference in a transmission mode when the transmission apparatus transmits the electromagnetic wave signal and when the receiving apparatus receives the electromagnetic wave signal in a receiving mode.

2. The radio communication system according to claim 1, wherein
   the second information related to the transmitting and receiving antennas as associated by the first correlation information is information related to a transmitting angle around the antenna axis of the transmitting antenna and a receiving angle around the antenna axis of the receiving antenna, and
   the correction apparatus corrects the transmitting and receiving angles based on the first correlation information.

3. The radio communication system according to claim 2, wherein said correction apparatus
   determines a plurality of candidate first correlation information in advance by measurement and/or simulation,
   identifies a plurality of candidate inter-mode interference patterns from the candidate first correlation information, based on a similarity with the inter-mode interference pattern,
   corrects the transmitting and receiving angles based on the candidate inter-mode interference patterns.

4. The radio communication system according to claim 3, wherein the correction apparatus identifies the candidate inter-mode interference patterns by computing a square error between respective candidate inter-mode interference patterns and the inter-mode interference pattern.

5. The radio communication system according to claim 1, wherein the receiving mode is one of a plurality of receiving modes,
   and wherein the inter-mode interference pattern comprises third information related to a receiving power rate of a signal stream in the receiving modes as produced by the transmission mode.

6. The radio communication system according to claim 5, wherein said correction apparatus
   instructs the transmission apparatus to specify a transmitting angle and the transmission mode, and to transmit the electromagnetic wave,
   instructs the receiving apparatus to specify a receiving angle, and to transmit the receiving power rate for each receiving mode to the correction apparatus, and
   generates the first correlation information using the transmitting and receiving angles, and the inter-mode interference pattern.

7. A receiving apparatus connected to a transmission apparatus and that uses an electromagnetic wave having Orbital Angular Momentum (OAM), wherein the receiving apparatus
   corrects an antenna axis of a receiving antenna of the receiving apparatus and an antenna axis of a transmitting antenna of the transmission apparatus, based on first correlation information that associates second information related to the transmitting and receiving antennas and an inter-mode interference pattern that characterizes interference in a transmission mode when the transmission apparatus transmits the electromagnetic wave and when the receiving apparatus receives the electromagnetic wave in a receiving mode.

8. A correction apparatus that uses an electromagnetic wave having Orbital Angular Momentum (OAM) and is connected to a transmission apparatus and a receiving apparatus, wherein the correction apparatus
   corrects an antenna axis of a receiving antenna of the receiving apparatus and an antenna axis of a transmitting antenna of the transmission apparatus, based on first correlation information that associates second information related to the transmitting and receiving antennas and an inter-mode interference pattern that characterizes interference in a transmission mode when the transmission apparatus transmits the electromagnetic wave and when the receiving apparatus receives the electromagnetic wave in a receiving mode.

9. An antenna correction method, in a radio communication system that uses an electromagnetic wave having Orbital Angular Momentum (OAM), and that comprises a transmission apparatus and a receiving apparatus, wherein the method comprises:
   preparing first correlation information that associates second information related to a transmitting antenna of the transmission apparatus and a receiving antenna of the receiving apparatus and an inter-mode interference pattern that characterizes interference in a transmission mode when the transmission apparatus transmits the electromagnetic wave and when the receiving apparatus receives the electromagnetic wave in a receiving mode; and correcting an antenna axis of the receiving antenna of the receiving apparatus and an antenna axis of the transmitting antenna of the transmission apparatus, based on the first correlation information.

10. A non-transitory computer-readable recording medium storing an antenna correction program executed in a computer controlling an apparatus that uses an electromagnetic wave having an Orbital Angular Momentum (OAM) system and that is connected to a transmission apparatus and to a receiving apparatus, the executed program causing the computer to perform a process of correcting an antenna axis of a receiving antenna of the receiving apparatus and an antenna axis of a transmitting antenna of the transmission apparatus, based on first correlation information that associates second information related to the transmitting and receiving antennas and an inter-mode interference pattern that characterizes interference in a transmission mode when the transmission apparatus transmits the electromagnetic wave and when the receiving apparatus receives the electromagnetic wave in a receiving mode.

* * * * *